United States Patent
Handal et al.

(10) Patent No.: US 6,963,841 B2
(45) Date of Patent: Nov. 8, 2005

(54) SPEECH TRAINING METHOD WITH ALTERNATIVE PROPER PRONUNCIATION DATABASE

(75) Inventors: Anthony H. Handal, Westport, CT (US); Gary Marple, Boxborough, MA (US); H. Donald Wilson, White Plains, NY (US); Michael Lessac, Beverly Hills, CA (US)

(73) Assignee: Lessac Technology, Inc., White Plains, NY (US)

( * ) Notice: Subject to any disclaimer, the term of this patent is extended or adjusted under 35 U.S.C. 154(b) by 50 days.

(21) Appl. No.: 10/339,370

(22) Filed: Jan. 9, 2003

(65) Prior Publication Data

US 2003/0182111 A1 Sep. 25, 2003

Related U.S. Application Data

(63) Continuation-in-part of application No. 10/334,658, filed on Dec. 31, 2002, now Pat. No. 6,865,533, and a continuation-in-part of application No. 10/335,226, filed on Dec. 31, 2002.

(51) Int. Cl.$^7$ .............................................. G10L 15/04
(52) U.S. Cl. ...................... 704/270; 704/251; 704/257; 704/260
(58) Field of Search ................................. 704/235, 251, 704/257, 260, 243, 270, 276

(56) References Cited

U.S. PATENT DOCUMENTS

| | | | |
|---|---|---|---|
| 4,783,803 A | 11/1988 | Baker et al. | |
| 4,866,778 A | 9/1989 | Baker | |
| 4,903,305 A | 2/1990 | Gillick et al. | |
| 5,010,495 A | 4/1991 | Willetts | |
| 5,027,406 A | 6/1991 | Roberts et al. | |
| 5,231,670 A | 7/1993 | Golhor et al. | |
| 5,393,236 A | 2/1995 | Blackmer et al. | |
| 5,487,671 A | 1/1996 | Shpiro et al. | |
| 5,636,325 A | 6/1997 | Farrett | |
| 5,679,001 A | 10/1997 | Russel et al. | |

(Continued)

FOREIGN PATENT DOCUMENTS

| | | |
|---|---|---|
| GB | 2323693 | 9/1998 |
| WO | WO0182291 | 11/2001 |

OTHER PUBLICATIONS

U.S. Appl. No. 09/553,810, Filed: Apr. 21, 2000.

*Primary Examiner*—Abul K. Azad
(74) *Attorney, Agent, or Firm*—Anthony H. Handal; Kirkpatrick & Lockhart Nicholson Graham LLP

(57) ABSTRACT

In accordance with a present invention speech training system is disclosed. It uses a microphone to receive audible sounds input by a user into a first computing device having a program with a database consisting of (i) digital representations of known audible sounds and associated alphanumeric representations of the known audible sounds, and (ii) digital representations of known audible sounds corresponding to mispronunciations resulting from known classes of mispronounced words and phrases. The method is performed by receiving the audible sounds in the form of the electrical output of the microphone. A particular audible sound to be recognized is converted into a digital representation of the audible sound. The digital representation of the particular audible sound is then compared to the digital representations of the known audible sounds to determine which of those known audible sounds is most likely to be the particular audible sound being compared to the sounds in the database. In response to a determination of error corresponding to a known type or instance of mispronunciation, the system presents an interactive training program from the computer to the user to enable the user to correct such mispronunciation.

42 Claims, 4 Drawing Sheets

U.S. PATENT DOCUMENTS

| | | | |
|---|---|---|---|
| 5,717,828 A | 2/1998 | Rothenberg | |
| 5,728,960 A | 3/1998 | Sitrick | |
| 5,745,873 A | 4/1998 | Braida et al. | |
| 5,766,015 A * | 6/1998 | Shpiro | 434/156 |
| 5,787,231 A | 7/1998 | Johnson et al. | |
| 5,791,904 A | 8/1998 | Russel et al. | |
| 5,796,916 A | 8/1998 | Meredith | |
| 5,799,279 A | 8/1998 | Gould et al. | |
| 5,850,627 A | 12/1998 | Gould et al. | |
| 5,864,805 A | 1/1999 | Chen et al. | |
| 5,870,809 A | 2/1999 | Nishi | |
| 5,903,864 A | 5/1999 | Gadbois et al. | |
| 5,909,666 A | 6/1999 | Gould et al. | |
| 5,920,837 A | 7/1999 | Gould et al. | |
| 5,946,654 A | 8/1999 | Newman et al. | |
| 5,960,394 A | 9/1999 | Gould et al. | |
| 6,055,498 A | 4/2000 | Neumeyer et al. | |
| 6,071,123 A | 6/2000 | Tallal et al. | |
| 6,081,780 A | 6/2000 | Lumelsky | |
| 6,144,939 A | 11/2000 | Pearson et al. | |
| 6,188,984 B1 | 2/2001 | Manwaring et al. | |
| 6,249,763 B1 * | 6/2001 | Minematsu | 704/252 |
| 6,253,182 B1 | 6/2001 | Acero | |
| 6,266,637 B1 | 7/2001 | Donovan et al. | |
| 2003/0144842 A1 | 7/2003 | Addison et al. | |

\* cited by examiner

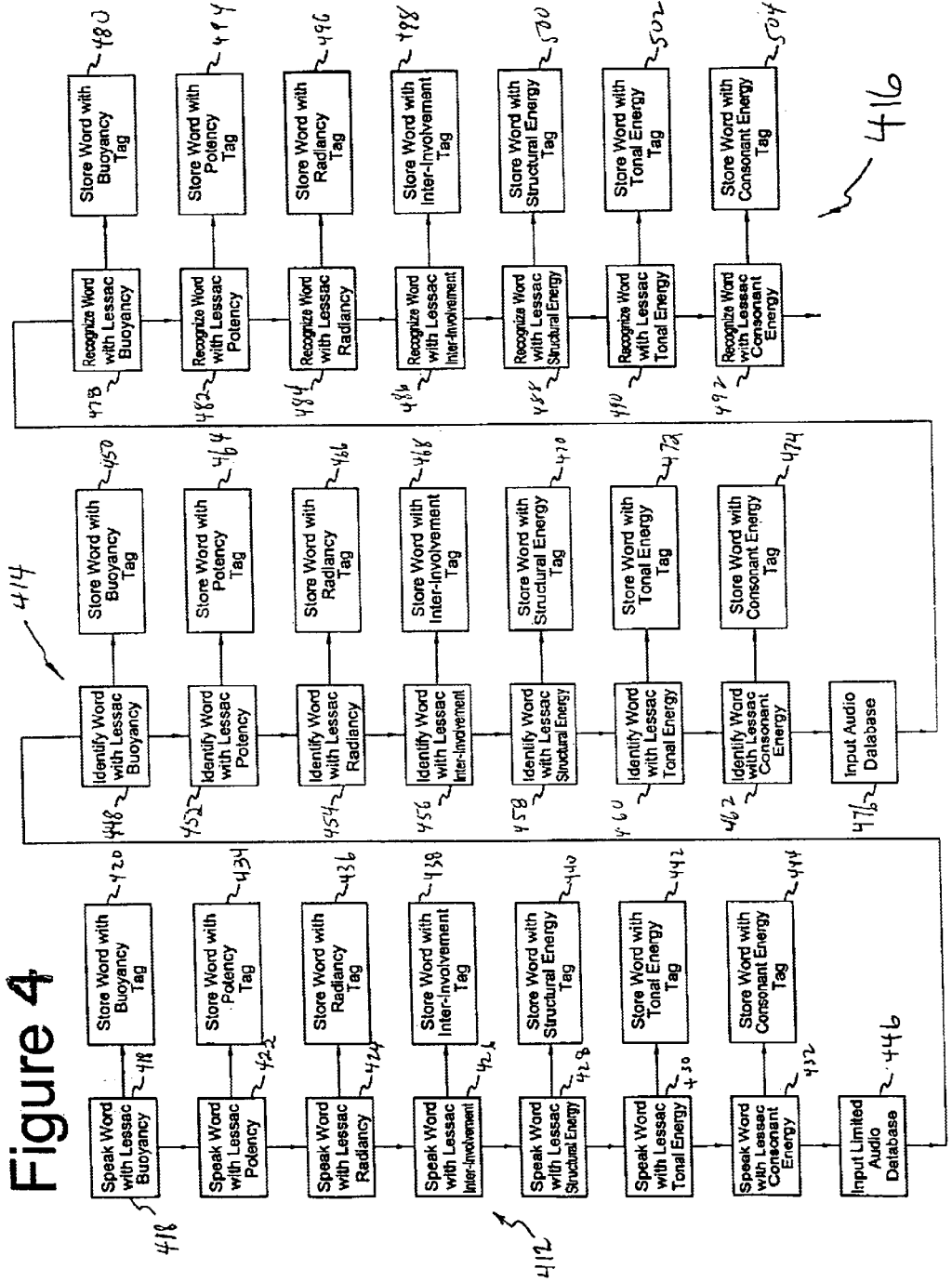

SPEECH TRAINING METHOD WITH ALTERNATIVE PROPER PRONUNCIATION DATABASE

CROSS REFERENCE TO RELATED APPLICATIONS

The present invention is a continuation-in-part of U.S. patent application Ser. No. 10/334,658 entitled "Text to Speech" filed Dec. 31, 2002, now U.S. Pat. 6,865,533 and U.S. patent application Ser. No. 10/335,226 entitled "Speech Recognition Method" filed Dec. 31, 2002.

TECHNICAL FIELD

The present invention relates to voice training including in a preferred embodiment, instruction in color, such as emotion and various Lessac energies, and using speech recognition in color, such as emotion and particularly suited to be implemented on personal computer systems.

BACKGROUND

In 1964, a group of computer scientists marveled over the new computer being delivered into the computer center at the Courant Institute for Mathematical Sciences at New York University. The machine was the latest introduction from Control Data Corporation, a Model CDC 6600, whose speed and memory capacity far outstripped the 7.094 K random access memory capacity of the now humble IBM 7094 that it replaced. In a portent of things to come, they little suspected that IBM, within months, would obsolete the long heralded CDC 6600 with its IBM 360, a machine which, incredibly, had an unheard-of 360 K of RAM, all built with discrete components, a conservative move in the face of concerns about the reliability of the then-new integrated circuit technology. This impressive machine came to be housed in a room about eighteen feet square, and surrounded by ten or so air conditioners necessary to keep the system from overheating and failing. A half dozen tape decks, nearly a meter across and as tall as a man, and several key punch machines, the size of garment outer table serving machines completed the installation.

Thirty-five years later, changes in technology have been remarkable. Tiny laptop computing devices fly at speeds a thousand times that of those early powerhouse computers and boast thousands of times the memory. Instead of huge reels of recording tape, hard disks with capacities on the order of eighteen GB are found in those same laptop computing devices. These devices, with their huge memory and computing capabilities, move as freely in the business world as people, under the arm, in a bag, or on the lap of a businessman flying across the ocean. No doubt, this technology lies at the foundations of the most remarkable, reliable and completely unanticipated bull market in the history of business.

Just as certainly, the future holds the promise of similar progress.

Notwithstanding the gargantuan magnitude of the progress made in computing during the last third of the 20th century, the world of computing has been largely self-contained. The vast majority of all computing tasks involved computers talking to other computers, or otherwise communicating through use of electrical input signals whose characteristics are substantially absolutely determined. In this respect, computers are completely unlike the humans which they serve, humans whose communications vary in almost infinite ways, regardless of the method of communication, be it voice, writing, or other means. If computing is to continue to make progress, computers must become integrated into usual human communications modalities.

And, indeed, this is already happening. From a slow start at becoming an important factor in the marketplace about a decade ago, speech recognition technology holds just such a promise. A human voice interface to a computer represents what should be probably the most ideal evolutionarily defined modality for-the human-computer communications interface. While humans customarily write, gesture and, to a limited extent, use other communications modes, voice communication remains predominant. This is not surprising, insofar as speech has evolved in human beings probably for many millions of years. This is believed to be the case because even relatively primitive forms of life have fairly highly developed "speech" characteristics. For example, much work has been done in the study of the use of sounds to communicate various items of information by whales. Likewise, scientists have identified and cataloged uniform global communications patterns in chimpanzees.

In view of the highly natural nature of communication by speech, a direct result of its having evolved over such a large fraction of the history of the species, speech communications impose an extremely low level of cognitive overhead on the brain, thus providing a facile communications interface while allowing the brain to perform a number of other functions simultaneously. We see this in everyday life. For example, people engaged in sports activities routinely combine complex physical tasks, situational analysis, and exchange of information through speech, sometimes simultaneously transmitting and receiving audible information, while doing all of these other tasks.

Clearly, the mind is well adapted to simultaneously control other tasks while communicating and receiving audible information in the form of speech. It is thus no surprise that virtually every culture on earth has devised its own highly sophisticated audible language.

In view of the above, it is thus, easily understood why voice recognition technology has come to be the Holy Grail of computing. While useful work began to be done with this technology about ten years ago, users only obtained performance which left much to hope for. Individual quirks, regional pronunciations, speech defects and impediments, bad habits and the like pepper virtually everybody's speech to some extent. And this is no small matter. Good speech recognition requires not only good technology, it also requires recognizable speech.

Toward this end, speech recognition programs generally have an error correction dialog window which is used to train the system to the features of an individual user's voice, as will be more fully described below. The motivation behind such technique is apparent when one considers and analyzes the schemes typically used in speech recognition systems.

Early on, speech recognition was proposed through the use of a series of bandpass filters. These proposals grew out of the use of spectrographic analysis for the purpose of speaker identification. More particularly, it was discovered that if one made a spectral print of a person saying a particular word, wherein the x-axis represented time and y-axis represented frequency, with the intensity of sound at the various frequencies being displayed in shades of gray or in black and white, the pattern made by almost every speaker was unique, largely as a function of physiology, and speakers could be identified by their spectrographic "prints." Interestingly enough, however, the very diversity which this technique showed suggested to persons working in the field the likelihood that commonalities, as opposed to differences, could be used to identify words regardless of speaker. Hence the proposal for a series of bandpass filters to generate spectrographs for the purpose of speech recognition.

While such an approach was logical given the state of technology in the 1960s, the problems were also apparent. Obtaining high-quality factors or "Q" in electrical filters comprising inductors and capacitors is extremely difficult at audio frequencies.

This is due to a number of factors. First of all, obtaining resonance at these frequencies necessitates the use of large capacitors and inductors. Such components, in the case of capacitors have substantial resistance leak through. In the case of inductances, large values of inductance are required, thus requiring large lengths of wire for the windings and, accordingly, high resistance. The result is that the selectivity of the filters is extremely poor and the ability to separate different bandpasses is compromised. Finally, the approach was almost fatally flawed, from a mass-market standpoint, by the fact that these tuned electrical circuits were very large and mechanically cumbersome, as well as very expensive.

However, in the late 1960's, electrical engineers began to model the action of electrical circuits in the digital domain. This work was done by determining, using classical analytic techniques, the mathematical characteristics of the electrical circuit, and then solving these equations for various electrical inputs. In the 1970's, it was well understood that the emerging digital technology was going to be powerful enough to perform a wide variety of computing tasks previously defaulted to the analog world. Thus, it was inevitable that the original approaches to voice recognition through the concept of using banks of tuned circuits would eventually come to be executed in the digital domain.

In a typical speech recognition system, an acoustic signal received by a microphone is input into a voice board which digitizes the signal. The computer then generates a spectrogram which, for a series of discrete time intervals, records those frequency ranges at which sound exists and the intensity of sound in each of those frequency ranges. The spectrogram, referred to in the art as a token, is thus a series of spectrographic displays, one for each of a plurality of time intervals which together form an audible sound to be recognized. Each spectrographic display shows the distribution of energy as a function of frequency during the time interval. In a typical system, sampling rates of 6,000 to 16,000 samples per second are typical, and are used to generate about fifty spectrum intervals per second for an audible sound to be recognized.

In a typical system, quantitative spectral analysis is done for seven frequency ranges, resulting in eight spectral parameters for each fiftieth of a second, or spectral sample period. While the idea that a spectral analysis over time can be a reliable recognition strategy may be counterintuitive given the human perspective of listening to envelope, tonal variation and inflection, an objective view of the strategy shows that exactly this information is laid out in an easy to process spectral analysis matrix.

Based on the theoretical underpinnings of the above recognition strategy, development of a speech recognition system involves the input of vocabulary into the hard drive of a computer in the form of the above described spectral analysis matrix, with one or more spectral analysis matrices for each word in the vocabulary of the system. These matrices then serve as word models.

In more advanced systems (such as those using so-called "natural" speech, that is continuous strings of words, the natural tendency of speakers to, on occasion, blend the end of one word into the beginning of another, and less frequently to separate words into two parts, sometimes with association of the parts with different words) models are also developed for these artifacts of the language to be recognized (herein after included within the term "phaser").

Once broken down into a spectral picture over time of frequency energy distributions, recognition of speech is reduced to comparison of known spectral pictures for particular sounds to the sound to be recognized, and achieving recognition through the determination of that model which best matches the unknown speech sound to be recognized. But this picture, while in principle correct, is an unrealistic simplification of the problem of speech recognition.

After a database of word models has been input into the system, comparison of an audible sound to the models in the database can be used as a reliable means for speech recognition. However, there are many differences in the speech patterns of users. For example, different speakers speak at different rates. Thus, for one speaker, a word they take a certain period of time, while for another speaker, the word they take a longer period of time. Moreover, different speakers have voices of different pitch. In addition, speakers may give different inflections, emphasis, duration and so forth to different syllables of a word in different ways, depending on the speaker. Even a single speaker will speak in different ways on different occasions.

Accordingly, effective speech recognition requires normalization of spoken sounds to word and phrase models in the database. In other words, the encoded received sound or token must be normalized to have a duration equal to that of the model. This technology is referred to as time aligning, and results in stretching out or compressing the spoken sound or word to fit it against the model of the word or sound with the objective of achieving the best match between the model and the sound input into the system. Of course, it is possible to leave the sound unchanged and stretch or compresses the model.

In accordance with existing technology, each of the spectral sample periods for the sound to be recognized are compared against the corresponding spectral sample periods of the model which is being rated. The cumulative score for all of the sample periods in the sound against the model is a quality rating for the match. In accordance with existing technology, the quality ratings for all the proposed matches are compared and the proposed match having the highest quality rating is output to the system, usually in the form of a computer display of the word or phrase.

However, even this relatively complex system fails to achieve adequate quality in the recognition of human speech. Accordingly, most commercial systems, do a contextual analysis and also require or strongly recommend a period of additional training, during which the above matching functions are performed with respect to a preselected text. During this process, the model is appended to take into account the individual characteristics of the person training the system. Finally, during use, an error correction dialog box is used when the user detects an error, inputs this information into the system and thus causes the word model to become adapted to the user's speech. This supplemental training of the system may also be enhanced by inviting the user, during the error correction dialog to speak the word, as well as other words that may be confused with the word by the system, into the system to further train the recognition engine and data base.

As is apparent from the above discussion, the development of speech recognition systems has centered on assembling a database of sound models likely to have a high degree of correlation to the speech to be recognized by the speech recognition engine. Such assembly of the database takes two forms. The first is the input of global information using one or more speakers to develop a global database. The second method in which the database is assembled is the training of the database to a particular user's speech, typically done both during a training session with preselected text, and on an ad hoc basis through use of the error correction dialog window in the speech recognition program.

In over fifty years of work, Arthur Lessac has developed a complete voice system reflecting, for the first time, the basic relationship between music and speech. His discovery and development was done empirically but was related to much formal academic work. His work early linked an understanding of music and singing with voice theory and rests on his decision to make a radical departure from traditional methods of studying and teaching voice. Very early in his speech work, Lessac decided that teaching or learning by imitating others was insufficient and damaging. He determined to develop a system of learning based upon sensation and feeling and kinesthetic feedback principles. This required extensive practical and formal study of the natural functioning of the body and the voice.

During almost this same fifty—year period, music historians began to go beyond studies of the history of western classical music. Inter—cultural studies linked western, eastern, African and other music. Related anthropological, archeological, historic and music work began to provide some insight into the origins of speech and music. Since these origins were before the time of recorded history, little progress was made until a number of studies of still—existing primitive tribes. No one has, as yet, described the whole relationship between music and speech as has Lessac. However, there are indications that recent studies would support his main thesis.

Today no complete vocal system compares to the Lessac system. A voice system must deal with two functional aspects and one operational aspect of speech. Functionally, speech consists of vowels and consonants. Operationally, there is the linking together within a word, sentence, paragraph or speech of the different sounds where different emphasis can vary meaning. The connection between vowel sounds and music has long been recognized—though never in a phonetic system. However, the same connection between the functional characterisitics of consonants and musical instruments and between the relationship between speech and a musical score has never before been developed.

Voice and speech theory and training today depends heavily upon the International Phonetic Alphabet (IPA). The IPA was created a century ago by a committee of Western European scholars. The IPA is fine for mapping sound. It does remove orthographic traps, and it provides the student with a guide to specific vowel and consonant sounds in other languages that are missing in his own, although even in this context it does little more than any other alphabet when the spelling of a given language—Spanish, for example—is simplified. But, it is a weak and artificial tool for teaching live people how they should sound. It is cumbersome, complicated, and outdated. It encourages a non-creative approach that is acoustic, imitative and mechanical. And, it includes too many vocal traps.

A symbol from the IPA system maps all of the possible sounds of the language, separating out deviations due to regional genesis which do not discriminate meaning within the culture. This symbol must then be learned or memorized in conjunction with a sound (thus, involving the ear) in order to be understood and then spoken.

And, the IPA does not deal at all with the operational linking together of sounds within words, phrases and larger units of speech. It is not a vocal system—merely an attempt at some definition of comparative sounds.

Functionally, Lessac vowels are "numeric and kinesthetic", and Lessac consonants are "imagistic, kinesthetic and potentially numeric" in contrast to the purely symbolic nature of the IPA vowel and consonant phonetics.

Operationally, Lessac's methods of "exploration" and the elimination of any basic difference between singing and speaking utilize the basic musical qualities in all uses of the voice.

At the same time, the Lessac voice system includes and adapts important elements from previous systems of acoustic phonetics, articulatory phonetics, auditory phonetics and physiological phonetics.

In the Lessac Vowel System, the numbers directly connect to a structure and kinesthetic feel which, when replicated, creates the desired sound without necessitating control by the ear, and, thus, avoiding the conditioned pitfalls of poor vocal environment. Based on a direct transfer from numeric description to action, this method of learning leaves no room for intervening influences to dilute or interfere with the process. In addition, the vowel is fed by a vibratory and resonance feel that aids in enforcing the phonetic value and provides a significant qualitative component to what in other systems remain, by and large, a quantitative dimension.

In this way, the Lessac vowel system eliminates the IPA concept of front, middle and back vowels, or high and low vowels; it discourages the mechanistic handling of glottal, pharyngeal, velar, palatal, retroflex, dental, labial manipulations; it avoids reliance upon the ear for essential control.

The Lessac Consonant System (described at pages 129–179 of Arthur Lessac's THE USE AND TRAINING OF THE HUMAN VOICE, Drama Book Publishers 1967), relates consonants to musical instruments. Each of the consonants reflects a musical instrument and involves both the sound and the image of the playing of the instrument—images of touch, rhythm, melody, size and subtlety.

To understand the instrument means to understand not only the sound itself but also the kinesthetic feel of the way the instrument is played and the different uses to which it can be put. It is an aesthetic construction and functions as a physical image.

In conventional voice and speech training, even when the habit is more or less automatic, the sight of a "T" or a "V" will prepare the tongue and gum—ridge of the lips to execute the action to produce the desired explosive or fricative sound, but the sound that comes out is often unanticipated, irregular, defective and undetected by the ear. The impression often is that there must be at least a half dozen ways of making the sound.

In the Lessac Consonant System, the picture of a snare drum with a "T" written on the picture will, after one has been taught the aesthetics of a drum beat, bypass and cut through the complexities of tongue manipulation, the memories of imitation, the listening by ear, etc. The student is not only make a perfect "T" sound but will thereby also know how to feel the drumbeats of the "K", "P", "D", "B", and "G" without any additional training. What is more, once the concept is clear, one can ask a deaf person, or a foreigner, whether Chinese or French, to feel an "R"—trombone, or a "V"—cello, or an "S"—sound effect, or a "CH"—cymbal. The result has been shown to be clear and perfect every time without ear judgment, mental confusion, physical or physiological gymnastics, and unaffected by any previous cultural or sectional influences that might work against this articulation.

Traditionally, the study of voice and speech is divided into different disciplines—voice for singing, voice for speech, diction, public speaking, therapy, etc. However, fundamental Lessac concepts serve all disciplines. All voice and speech is basically musical with the difference between speaking and singing being a relative one.

Traditionally, consonants have been thought of as "articulated" sounds—primarily important for intelligibility. The Lessac instrumental approach to consonants suggests a reversal of the relative position of vowels and consonants in singing and speaking. In singing, the vowels make the principal artistic contribution; the consonants a utilitarian one. But, in general speech, the consonants carry most of the melody and rhythm, while the vowels serve primarily for emphasis.

As the student comes to understand that the voice and speech with its vowels and consonants have a symphonic quality and range, and that one can "play" the voice in a musical and instrumental way, one comes to use another, total image in speaking, namely, the image of an orchestra playing a piece of music.

In teaching through an organized and related group of images, the Lessac approach directs focus to the exploration at hand and perhaps obviates most of the inhibitory and competing response pattern a normal learning situation implicitly contains. It is sometimes difficult to communicate, but when communicated, it contains a tremendous amount of information in a "chunked" and, therefore, memorized state. Through a special kind of learning, images chunk information.

Many people on first understanding the Lessac voice theory assume that his use of musical instruments to teach consonants and his overall musical approach is simply a useful teacher's analogy—or, if they disagree with it, a "trick" of some kind. However, studies of the origins of music suggest that the relationship between music and speech and, within that, between consonants and musical instruments appears to be a fundamental one. In all cultures, the development of specific instruments and vocal sounds appears to have been an inter—related process. Certain instruments were built to mirror the image or sound of the vocal instrument and certain vocal sounds were made to mirror pleasing instrumental images or sounds—such as, basic percussive sounds, the twang of a bow string or the tone of an early horn.

The Lessac consonant system applied to English reflects the instruments of Western European culture and its symphony orchestra. Though the basic instruments are the same in all cultures the drum, the horn, the stringed instrument, etc., specific variations reflecting specific different consonant sounds remain to be defined as the Lessac voice system is applied to languages in other cultural settings.

SUMMARY OF THE INVENTION

The present invention stems from the recognition that spectrograms of audible sounds may be used not only to characterize speakers and words, but also mispronunciations. In accordance with the invention, speech recognition software is used with the objective of improving the speech patterns of persons using the software. The result is voice training for the user. Such training is of great importance. For example, salesman, lawyers, store clerks, mothers dealing with children and many others rely heavily on oral communications skills to accomplish daily objectives. Nevertheless, many individuals possess poor speaking characteristics and take this handicap with them to the workplace and throughout daily life.

Perhaps even more seriously, speech defects, regionalisms, and artifacts indicative of social standing, ethnic background and level of education often hold back persons otherwise eminently qualified to advance themselves in life. For this reason, speech, as a subject, has long been a part of the curricula in many schools, although in recent years education in this area has become, more and more, relegated to courses of study highly dependent on good speaking ability, such as radio, television, motion pictures and the theater.

Part of the problem here has been the difficulty of finding good voice instructors in the relatively high cost of the individualized instruction needed for a high degree of effectiveness in this area. In accordance with the invention, a specialized but highly effective speech training regimen is provided for receiving human language inputs in audio form to a microphone, analyzing the same in a personal computer and outputting alphanumeric guidance and aural pronunciation examples from the sound card and speakers associated with a personal computer.

In accordance with a present invention voice training is performed on a first computing device using a microphone to receive audible sounds input by a user into a first computing device having a program with a database comprising (i) digital representations of known audible sounds and associated alphanumeric representations of the known audible sounds and (ii) digital representations of known audible sounds corresponding to mispronunciations resulting from known classes of mispronounced words and phrases. The method is performed by having the person being trained read a preselected text and translating the audible sounds into the form of the electrical output of a microphone being sent to a computer. A particular audible sound to be recognized is converted into a digital representation of the audible sound.

The digital representation of the particular audible sound is then compared to the digital representations of a proper pronunciation of that audible sound to determine whether there is an error that results from a known type or instance of mispronunciation. In response to such a determination of mispronunciation error corresponding to a known type or instance of mispronunciation, the system presents an interactive training program from the computer to the user to enable the user to correct such mispronunciation.

The presented interactive training program comprises playback of the properly pronounced sound from a database of recorded sounds corresponding to proper pronunciations of the mispronunciations resulting from the known classes of mispronounced words and phrases.

In accordance with a preferred embodiment of the invention, the user is given the option of receiving speech training or training the program to recognize the user's speech pattern, although this is the choice of the user of the program.

In accordance with the invention, the determination of whether the error is a result of a known type or instance of mispronunciation is performed by comparing the mispronunciation to the digital representations of known audible sounds corresponding to mispronunciations resulting from known classes of mispronounced words and phrases using a speech recognition engine.

It is anticipated that the inventive method will be implemented by having the database comprising (i) digital representations of known audible sounds and associated alphanumeric representations of the known audible sounds and (ii) digital representations of known audible sounds corresponding to mispronunciations resulting from known classes of mispronounced words and phrases, generated by the steps of speaking and digitizing the known audible sounds and the known audible sounds corresponding to mispronunciations resulting from known classes of mispronounced words and phrases. The database will then be introduced into the computing device of many users after the generation by speaking and digitizing has been done on another computing device and transferred together with voice recognition and error correcting subroutines to the first computing device using CD-ROM or other appropriate data carrying medium.

It is also contemplated that mispronunciations are input into the database by actual speakers that have such errors as a natural part of this speech pattern.

BRIEF DESCRIPTION OF THE DRAWINGS

Several ways of carrying out the invention are described below in connection with the figures, in which:

FIG. 4 is a block diagram illustrating a further detail of the alternative embodiment of FIG. 3 of the voice recognition program in accordance with the method of the present invention.

DETAILED DESCRIPTION OF THE PREFERRED EMBODIMENTS

Figure 1:
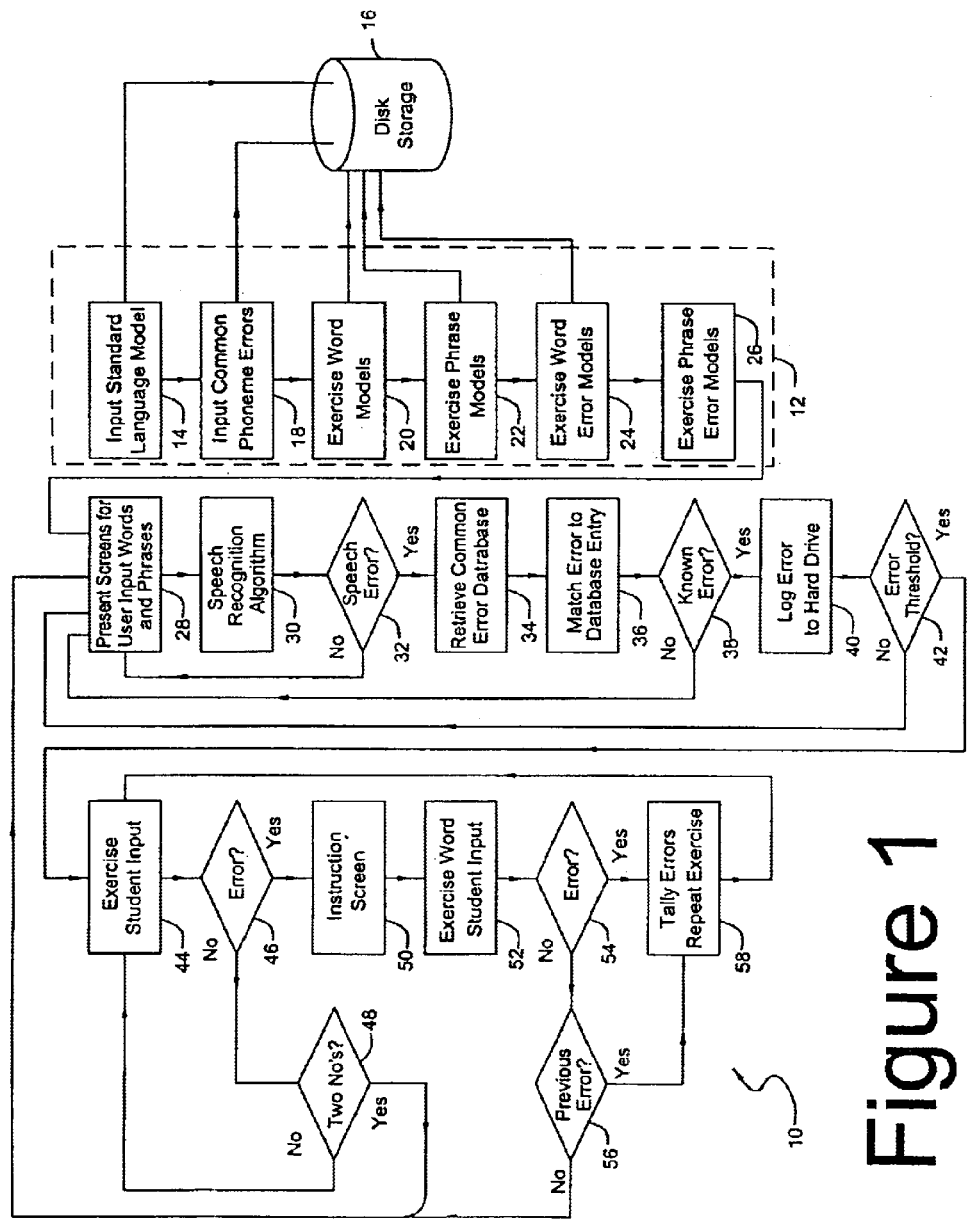
FIG. 1 is a block diagram illustrating a voice recognition program in accordance with the method of the present invention.

Referring to FIG. 1, the system and method of the present invention may be understood. In accordance with the inventive method 10, a voice and error model is generated using subroutine 12. Subroutine 12 comprises a number of steps which are performed at the site of the software developer, the results of which are sent, for example, in the form of a CD-ROM, other media or via the Internet, together with the software for executing voice recognition, to a user, as will be apparent from the description below. In accordance with the present invention, the inventive speech recognition method may be practiced on personal computers, as well as on more advanced systems, and even relatively stripped down lightweight systems, such as subnotebooks and even smaller systems provided at the same have systems for interfacing with and receiving the output of a microphone. It is noted that quality sound board electronics is important to successful operation of the method of the invention, and USB microphones are preferred.

Development Phase

At step 14 a database of word models is generated by having speakers speak the relevant words and phrases into a microphone connected to the sound board of the personal computer being used to generate the database. In accordance with the preferred embodiment of the invention, speakers who have been trained in proper speech habits are used to input words, phrases and sounds into the database at step 14. As the information is generated by the speakers speaking into microphones, attached to the sound boards in the computer, the information is digitized, analyzed and stored on the hard drive 16 of the computer.

In accordance with the present invention, relatively common phoneme pronunciation errors are also input into the system at step 18. In this specific context the term "phoneme" is used to mean the smallest sound, perhaps meaningless in itself, capable of indicating a difference in meaning between two words. The word "dog" differs from "cog" by virtue of a change of the phoneme "do" pronounced "daw" and "co" pronounced "cah."

Thus, at step 18, the model generating speaker can speak a database of common phoneme errors into the microphone attached to the sound board of the computer to result in input to the database stored on the hard drive 16 of the computer. However, it is preferred that the phoneme errors are spoken by persons who in various ways make the pronunciation error as part of their normal speech patterns.

At step 20, the system is enhanced by the introduction into the database contained on hard drive 16 of a plurality of exercise word models, selected for the purpose of training the speech of a user of the system. The same are input into the system through the use of a microphone and sound board, in the same way that the database of the language model was input into the system. Generally, a collection of word and/or phrase models is associated with each type of phoneme error. This is because if a person makes a speech pronunciation error of a particular type, it is likely that the same speaker makes certain other errors which have common characteristics with other pronunciation errors in the group. For example, a person who mispronounces the word "them" to sound like "dem" is also likely to mispronounce the words "that," "those," and "these."

Exercise phrase models are input at step 22. These exercise phrase models are stored by the system in hard drive 16. The exercise word models and the exercise phrase models input into the system at steps 20 and 22, respectively are associated in groups having common mispronunciation characteristics. The same are input into the system through the use of a microphone and sound board, in the same way that the database of the language model was input into the system.

In addition, in accordance with the present invention, it is recognized that computer errors may result in misrecognition of a particular error, mistaken acceptance of a mispronunciation, or mistaken rejection of a proper pronunciation. Accordingly, during the database generation session during which properly pronounced exercise word models or exercise phrase models are input into the system at steps 20 and 22, audio recordings of the same are also stored on hard disk 16, to allow for playback of these proper pronunciations during use of the program by a person performing speech recognition using the program. This provides for an audible cue to the user and allows the user to monitor the reliability of the system during the voice recognition and speech training process of the present invention.

In accordance with the invention, it is anticipated that there may be more than one mispronunciation associated with a particular word or phrase. Accordingly, at step 24, a plurality of typical mispronunciations are input into the system to create a database of exercise word error models on hard drive 16. The same are input into the system through the use of a microphone and sound board, in the same way that the database of the language model was input into the system.

Finally, the database of relatively common mispronunciation errors is completed at step 26 where the speaker generating that database speaks into the system to generate a plurality of exercise phrase error models. These error models are also input into the system through the use of a microphone and stored on hard drive 16.

In accordance with a preferred embodiment of the invention, the input of audible sounds into the system to generate the word error models at step 24 and the exercise phrase error models at step 26 is done using a speaker or speakers who have the actual speech error as part of their normal speech patterns. The same is believed to achieve substantially enhanced recognition of speech errors, although the same is not believed to be necessary to a functioning system.

In accordance with the preferred embodiment of the invention, the models stored on hard disk 16, and generated as described above may be recorded on a CD-ROM or other program carrying media, together with a voice recognition engine, such as that marketed by any one of a number of manufacturers such as IBM, Dragon Systems, and others. In accordance with a present invention, such a prior art speech recognition program may be used for both the purpose of recognizing words, recognizing mispronunciations and phoneme errors, together with the above described audio recordings of proper pronunciations, during speech training sessions with the inventive interactive program.

In accordance with the invention, such software comprising the speech recognition engine, editing and training utilities, and database of word models, phrase models, vocal recordings, and error models may be supplied to the user for a one time fee and transported over a publicly accessible digital network, such as the Internet. Alternatively, the software may be made available for limited use for any period of time with charges associated with each such use, in which case the software would never be permanently resident on the computer of a user.

User Training Program

When a user desires to use the inventive program, the software containing the program and the database is loaded into a personal computer and the student user is instructed to read a preselected text that appears on the screen of the computer. Thus, words are spoken into a microphone coupled to the sound board of the computer, in order to input the speech into the computer in the manner of a conventional speech recognition program.

More particularly, as discussed above, after the system has proceeded through the performance of steps 14, 18, 20, 22, 24 and 26, and the speech recognition engine, editing and training utilities added, the system proceeds at step 28 to receive, through a microphone, speech to be recognized from a user of the program who has loaded the speech recognition engine, editing and training utilities, and database of word models, phrase models, vocal recordings, and error models onto the user's personal computer. In this respect, the operation of the voice training program of the present invention is substantially identical to speech recognition programs presently on the market except for the database additions. More particularly, at step 30, a conventional speech recognition algorithm is applied to recognize audible sounds as the words which they are meant to represent.

The computer then outputs the recognized speech on the screen of the computer monitor, and the next phrase uttered by the user proceeds at step 30 through the speech recognition algorithm resulting in that speech also being displayed on the monitor screen. When the user notices that an error has occurred, he may use any one of a number of different techniques to bring up an error correction window at step 32. For example, he may simply double-click on the error, or highlight the erroneous recognition and hit a key dedicated to presentation of the error correction window.

User correction occurs at step 34. In typical programs, call up of the error correction window results in the presentation of a screen showing the highlighted word, and suggesting, through the use of a menu, a number of alternatives which may be selected for double-clicking, in order to correct the error. If the problem word is not in the menu of alternatives, the user may type in the problem word or spell it out.

After the system has been given the correct word by any of these means, the same is input into the system.

At this point, the call up of the error correction window at step 34 has indicated to the system that there is an error. While some errors are unrelated to pronunciation errors, many are. Once the user indicates the error, the system then proceeds at step 36 to determine whether the error made by the user is recognized as one of the speech errors recognized by the system. If it is, this information is determined at step 38. The nature of the pronunciation error is then input into the system and logged at step 40. In this manner, the system keeps track of the number of errors of a particular type for the user by storing them and tallying them in hard drive 16.

In accordance with the present invention, it is contemplated that the speech training will not be triggered by a single mispronunciation. Instead, it is contemplated that the repeated instances of a single type of mispronunciation error will be tallied, and when a threshold of pronunciation errors for that error is reached in the tally, only then will speech training be proposed by the appearance on the screen of a prompt window suggesting speech training. The same could take the form of a window having the words "The system has determined that it is likely that we can improve your speech by coaching you now. Standby to talk to the speech coach." The screen may also have a headline above the question, such as "The coach wants to talk to you!" The screen will also have a button bar "OK" to given the user the opportunity to click on the "OK" to start a training session. A button marked "Cancel" may also be included so the student may click on the "Cancel" button to delay the speech coaching session a limited amount of time or reading later.

It is also noted that other combinations of events may be used to trigger training. For example, if the particular mispronunciation detected is a very well-defined one, such as the almost uniform tendency of some speakers to mispronounce the word "oil" as "earl", the definiteness with which this error has been determined makes training relatively likely to be necessary, and the threshold for that error can be lowered to, for example, one instance of that error being detected. In other cases, or in the general case, one may wish to set the threshold at three, five or even ten instances of the error before the "The coach wants to talk to you!" screen is presented to the user of the system.

Once a mispronunciation has been detected by the system, the error correction algorithm operates in a manner identical to the conventional speech recognition algorithm at step 30, except that error correction algorithm checks the database of common phoneme errors input into the system by the software developer at step 18 and the exercise word error models and exercise phrase error models input at steps 24 and 26. In connection with this, it is noted that the so-called phoneme errors relate to particular sounds consisting of one syllable or less, while the phrase and word models are somewhat more general, as described herein.

Thus, if, at step 42 the system determines that the threshold number of errors in that class has not been reached, it sends the system back to step 28, where speech recognition proceeds. If, on the other hand, a predetermined number of errors of the same class have been detected by the system and logged at step 40, at step 42 the system is sent to step 44 where the above described "The coach wants to talk to you!" screen is presented to the user, who is thus given the opportunity to train his voice.

If the user declines the opportunity to train at step 46, the system is returned to step 28, where, again, reading of the rest of the preselected pronunciation error detecting text proceeds. This is an option which may not be given, forcing the student to train, if the triggering number of errors have been made.

In the other case, at step 46, when the user decides to accept speech training, the system proceeds to step 48, where the determination is made as toward whether the particular error is an error in the pronunciation of a word or what is referred to herein as a phrase. By "phrase" in this context, is meant at least parts from two different words. This may mean two or more words, or the combination of one or more words and at least a syllable from another word, and most often the end of one word combined with the beginning of another word, following the tendency of natural speakers to couple sounds to each other, sometimes varying their stand-alone pronunciation. If, at step 48 the system determines that the mispronunciation is the mispronunciation of a word, the system is sent to step 50 where the system retrieves from memory words which have the same or similar mispronunciation errors.

As noted above, these words have been stored in the system, not only in the form of alphanumeric presentations, but also in high-quality audio format. The object of the storage of the high-quality audio sound is to provide for audible playback of the words in the training dialog screen.

The sounds retrieved at step 50 are also presented on-screen in alphanumeric form to the user and the user is invited to pronounce the word at step 52. If the word is pronounced properly, this is determined at step 54. If there is no error, the system proceeds to step 56 where the system determines whether there are two consecutive incidences of no error having occurred. If no error has occurred twice consecutively, the system is returned to act as a voice recognition system at step 28. If no error has occurred only once, at step 58 the system is returned to the training dialog screen at step 50 and the student user is invited to pronounce the same or another word having the same type of mispronunciation to ensure that the user is saying the sound correctly. Once the student has pronounced the sound twice in a row without errors, the student is returned at step 56 to the voice recognition function.

However, where an error has been detected at step 46, the system proceeds to step 50 to where an instruction screen telling the student how to make the sound, with physical instructions on how to move the muscles of the mouth and tongue to achieve the sound is presented to the student.

The screen allows for the incorporation of more creative speech training approaches such as the Lessac method described in *The Use and Training of the Human Voice—A Bio-Dynamic Approach to Vocal Life*, Arthur Lessac, Mayfield Publishing Co. (1997). In this technique the user is encouraged to use his "inner harmonic sensing." This enhances the description of a particular sound by having the user explore how the sound affects the user's feelings or encourages the user to some action.

In an illustrative example, the Lessac method teaches the sound of the letter "N" by not only describing the physical requirements but also instructs the user to liken the sound to the "N" in violin and to "Play this consonant instrument tunefully." This screen also has a button which may be clicked to cause the system to play back the high-quality audio sound from memory, which was previously recorded during software development, as described above.

The system may also incorporate interactive techniques. This approach presents the user with a wire frame drawings of a human face depicting, amongst other information, placement of the tongue, movement of the lips, etc. The user may interactively move the wire frame drawing to get a view from various angles or cause the sounds to be made slowly so that the "facial" movements can be carefully observed.

Also, in accordance with the invention, it is contemplated that substantial improvement in the system may be obtained by training the database in the system in accordance with the training techniques and in accordance with the speaking techniques of individuals who are familiar with the particular method of speech training a to be implemented in the system. For example, if the system will use the so-called Lessac system, that the individuals inputting into the database should be Lessac trained speakers who will input a vocal phonetic database which is particularly well tailored to the Lessac standard. On the other hand, if the system is to use another system other than Lessac, in that case, the person inputting the information into the database of phonetic sounds, words, and so forth would be individuals trained in that other system, thus resulting in consistency between the database and the particular training methodology used.

This screen also has a button which may be clicked to cause the system to play back the high-quality audio sound from memory, which was previously recorded during software development, as described above.

The student is then invited to say the sound again, and at step 52, the student says the word into the microphone which is coupled to the computer, which compares the sound to the database for proper pronunciation at determines whether there is an error in the pronunciation of the word at step 54.

If there is an error, the error tally flag is set at step 58 and the system is sent back to step 50 where, again, the sound is displayed in alphanumeric form and the user invited to say the sound into the machine with the system testing the output to determine whether there is an error at step 54. If no pronunciation error is found, the system determines in step 56 if the previous attempt was an error by checking whether the tally error flag is set. If the flag is set, indicating that the previous attempt had a pronunciation error, then the system is sent to step 58 where the tally flag is now cleared and the system returns to step 50. In step 56, if the tally flag is found not set, indicating that the previous attempt had no pronunciation error, then the standard of two consecutive correct pronunciations has been met and the system until training has been completed.

If, at step 48 the system determines that the mispronunciation is the mispronunciation of a phrase, the system is sent to step 50 where the system retrieves from memory phrases which have the same or similar mispronunciation errors.

As noted above, these phrases have been stored in the system, not only in the form of alphanumeric presentations, but also in high-quality audio format. The object of the storage of the high-quality audio sound is to provide for audible playback of the words in the training dialog screen.

The phrase retrieved at step 50 is also presented on-screen in alphanumeric form to the user and the user is invited to pronounce the phrase. If the phrase is pronounced properly, this is determined at step 54. If there is no error, the system proceeds to step 58 where the system determines whether there are two consecutive incidents of no error having occurred. If no error has occurred twice consecutively, the system is returned to act as a voice recognition system at step 28.

However, where an error has been detected at step 54, or no error has occurred only once in step 56, the system proceeds to step 50 where an instruction screen telling the user how to make the sound, with physical instructions on how to move the muscles of the mouth and tongue to achieve the sound is again presented to the user. This screen also has a button which may be clicked to cause the system to playback the high-quality audio sound from memory, which was previously recorded during software development, as described above.

The user is then invited to say the sound again, and at step 52, the user says the phrase into the microphone which is coupled to the computer, which compares the word to the database for proper pronunciation and determines whether there is an error in the pronunciation of the word at step 54.

If there is error, the system is sent back to step 50 where, again, the word is displayed and the user invited to say the word into the machine to determine whether there is error, with the system testing the output to determine whether it should proceed to speech recognition at step 28, when the standard of two correct pronunciations has been reached. If there is no error at step 50, however, the tally is cleared and the system proceeds to step 28, where normal speech recognition continues, the training session having been completed.

Figure 2:
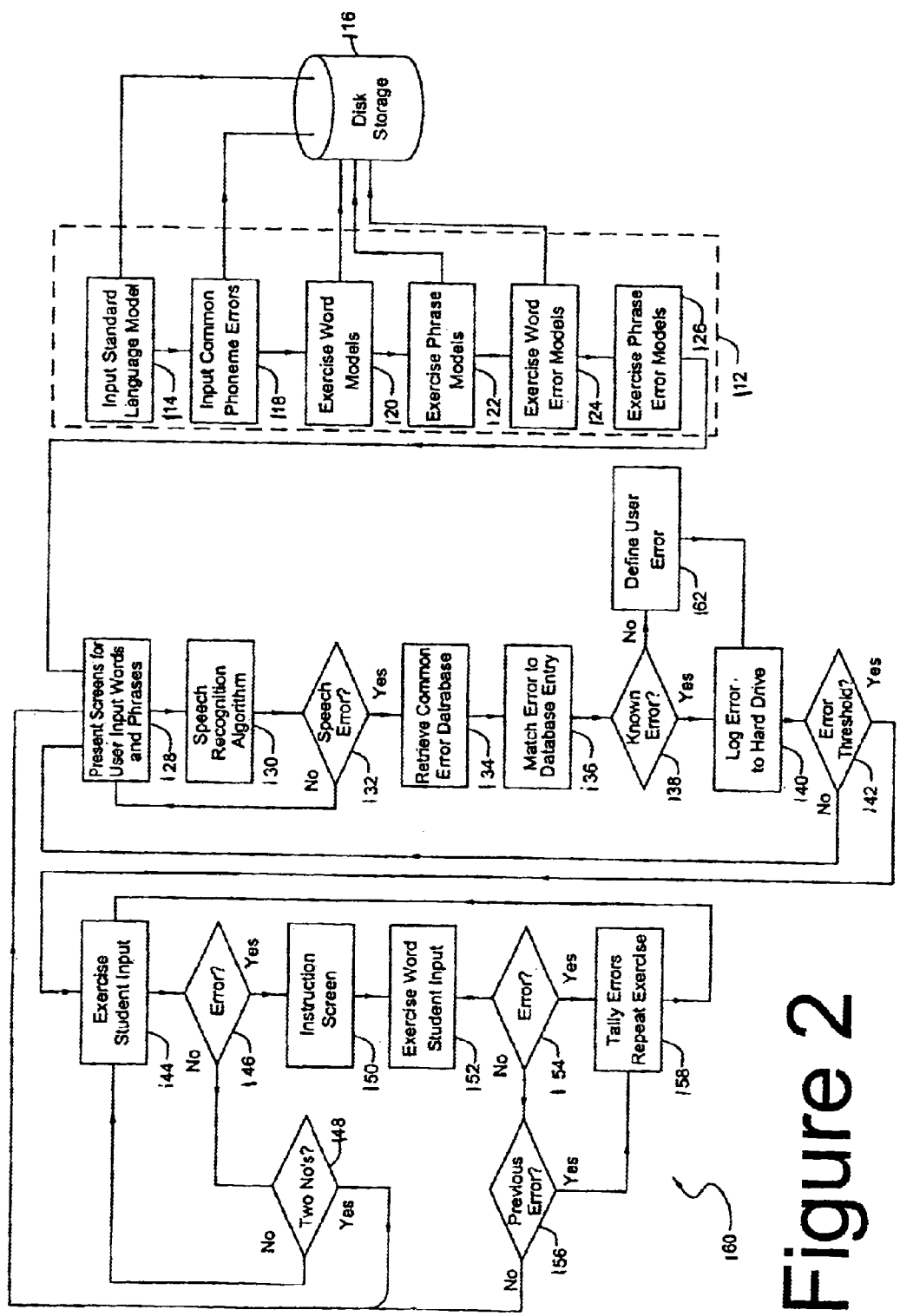
FIG. 2 is an alternative embodiment of the inventive system.

An alternative embodiment of the invention 110 is shown in FIG. 2, wherein steps analogous to those of the FIG. 1 embodiment are numbered with numbers one hundred higher than those in the FIG. 1 embodiment. In FIG. 2, the user has the additional alternative of training the database rather than having the database train his speech in step 62. This option is provided for those users who have particular speech habits that the user wants to accord special attention. The database is taught the user's particular pronunciation error at step 62. The user can assign a high error threshold or tell the database to ignore the error if he or she does not want training and prefers to keep his or her speech affection. Alternatively, the user may assign a low error threshold if he or she desires extra training for a certain type of error.

In accordance with another embodiment of the invention, in addition to the use of Lessac techniques to assure the quality of the voice input by a user into the speech recognition system (through the provision of Lessac training to the user), the accuracy of the system, in recognizing mistakes (whether mistakes of pronunciation or mistakes involving incorrect emotional or Lessac energy content) is improved through the implementation of multiple database entries for a single word or phrase, each directed to a different version of the spoken word or phrase. By "version" is meant the same word spoken with a different emotion or Lessac energy. Thus, in addition to multiple database entries for a single word or phrase corresponding to a proper standard pronunciation and possible pronunciations corresponding to a dialect or regional pronunciation, or a mispronunciation, the system also includes the pronunciations corresponding to the pronunciation of the word with the various Lessac energies stressed, for example, buoyancy, potency, radiancy, inter-involvement, structural energy, tonal energy, and consonant energy. It is further contemplated that the thus possible recognition of speech with the various Lessac energies also utilizes regional pronunciations, or the like, pronounced with the various Lessac energies. It is noted that other energies have been postulated and that the same may be incorporated into the invention.

This is in contrast to prior art systems where the objective is to gather as great a diversity as possible of spoken words and define a single database entry for a particular word. While such a database will define an average profile for a given word, including frequency, amplitude, and statistical variation information, this approach results in averaging out large amounts of information.

Figure 3:
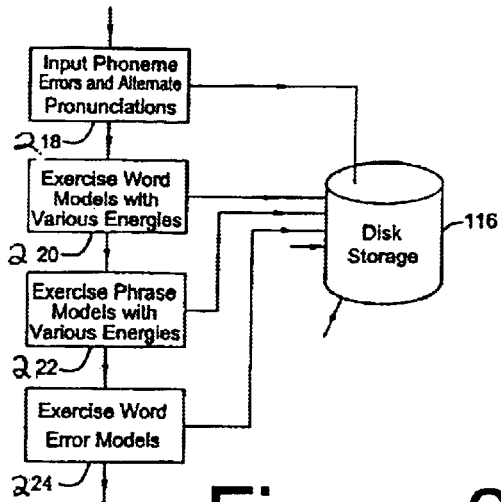
FIG. 3 is a block diagram illustrating a detail of an alternative embodiment of the voice recognition program in accordance with the method of the present invention.
Figure 5:
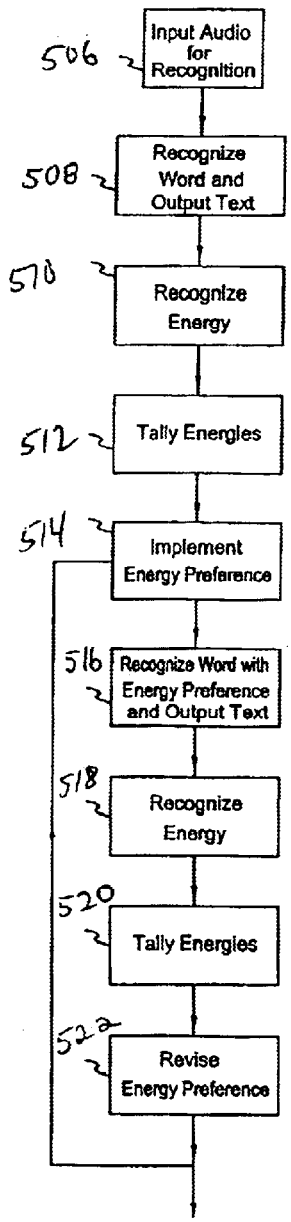
FIG. 5 is a block diagram illustrating an alternative text to speech routine in accordance with the method of the present invention.

In contrast, the present invention uses what may regarded as multiple databases in performing the voice recognition task associated with recognition of Miss pronunciations and, in accordance with the embodiment of FIGS. 3–5, the identification and perfection of emotional energy, the Lessac energies, or the like. The advantage is that the statistical variation between the spoken words which were used to generate the database entry for a particular word is much smaller. Accordingly, greater accuracy may be achieved during implementation of a recognition procedure.

Accordingly, recognition of an emotional state or Lessac energy sequence based on individual databases for each word pronounced in the various emotional states or Lessac energies is enabled. This in turn allows for the training of an individual to speak with a particular emotional content or Lessac energy, or the like, which characteristics may be referred to generally as the "color" of the speech. A database devoted to spoken words having a particular emotional content or Lessac energy will be referred to herein as a "clique", for example a "buoyancy clique".

This may be better understood from FIG. 3, which is a detail showing the implementation of the invention using the above inventive clique differentiating method. The method illustrated in FIG. 3 is identical to that illustrated in FIG. 1, with the input of a standard language model without emphasized Lessac energies at step 14. However, in contrast to step 18, at step 218, in addition to the input of common phoneme errors, the system also receives phonemes having various pronunciation colors which are parsed into the cliques with which they are associated. A fuller understanding of the detail illustrated in FIG. 3 may be had from FIG. 4, which will be described below.

In accordance with the invention, at step 220 exercise word models are received with various energies by the system in a process aimed at developing a comprehensive language model for each energy and emotion clique to be included within the system. In similar fashion, at step 222 exercise phrase models are received with various energies by the system in a process aimed at developing a comprehensive language model for each energy and emotion clique to be included within the system. At step 224 the system databases exercise word error models in the same manner as step 24. Thus, the generation of the database in the method of FIG. 3 parallels the generation of the database in the method of FIG. 1, but with the addition of, for example, Lessac energies. Other than this, the database generation portion of the method is substantially identical.

However, in accordance with the FIG. 3 embodiment, recognition of words and, their associated color, Lessac energy or the like, is achieved in a manner different in several respects, as will the described in a detail below with reference to FIG. 5.

The method illustrated in FIG. 3 may be better understood with reference to FIG. 4, which illustrates the input of data into the system which begins at step 218. More particularly, the information gathering methodology illustrated in FIG. 4 may be broadly segregated into the optional generation at process step group 412 of the database using speakers trained to impart the correct color or expressiveness to language. For example, Lessac trained speakers may be used. In addition, or optionally, at process step group 414 speech of numerous individuals may be reviewed by trained speech professionals, for example Lessac practitioners, identified with a particular clique and sent to the database with that information. Finally, once the system has been provided with spoken language samples tagged with appropriate color information, the system may be sped with additional spoken language samples at process step group 416, where the system recognizes the color of the spoken language sample and assigns it to the appropriate clique. Typical cliques would be cliques associated with happiness, sadness, excitement, terror, or the various Lessac energies, for example, buoyancy, potency, radiancy, inter-involvement, structural energy, tonal energy, and consonant energy.

In accordance with a preferred embodiment of the invention, the process of the generation of a database including color information starts at step 418 with a trained Lessac speakers speaking at a word with buoyancy. At step 420, the spoken language sample is stored in a database with a tag indicating that it possesses the quality of buoyancy. At steps 422–32, trained Lessac speakers speak words into the system with Lessac characteristics of potency, radiancy, inter-involvement, structural energy, tonal energy, consonant energy. Alternatively, or in addition, trained speakers may input into the system at additional steps spoken language samples reflecting various emotions, such as happiness, sadness, etc. At steps 434–444 the spoken language samples collected at steps 422–32 are stored in the database tagged with appropriate color information for segregation into cliques.

At process step group 414, starting with step 446, a collection of audio clips are then input into the system. At step 448 each sample is listened to by a trained speech professionals who identified as those words which contain Lessac buoyancy, for example. The identified spoken language samples are then tagged with a buoyancy tag and stored at step 450. At steps 452–62, trained speech practitioners identify words with Lessac characteristics of potency, radiancy, inter-involvement, structural energy, tonal energy, consonant energy. Alternatively, or in addition, the trained speech professionals may identify for input into the system at additional steps, spoken language samples reflecting various emotions, such as happiness, sadness, etc. At steps 464–474 the spoken language samples collected at steps 452–62 are stored in the database tagged with appropriate color information for segregation into cliques. Spoken speech samples not recognized as containing any particular characteristic or color which is being assembled may then be discarded.

At process step group 416, starting with step 476, an additional and potentially much larger collection of audio clips, i.e. spoken speech samples, are then input into the system. At step 478 each sample is analyzed by a voice recognition routine in which the information input into the system at process group steps 412 and 414 is used by the voice recognition routine (in which all of the cliques are used like a single large database) for the purpose of determining the existence of the quality of Lessac buoyancy. The identified spoken language samples are then tagged with a buoyancy tag and stored at step 480. At steps 482–92, the voice recognition system identifies words with Lessac characteristics of potency, radiancy, inter-involvement, structural energy, tonal energy, consonant energy. Alternatively, or in addition, the voice recognition software may identify for input into the system at additional steps, spoken language samples reflecting various emotions, such as happiness, sadness, etc. At steps 494–504 the spoken language samples collected at steps 482–92 are stored in the database tagged with appropriate color information for segregation into cliques. Spoken speech samples not recognized as containing any particular characteristic or color which is being assembled may then be discarded.

Optionally, in addition to the above processing, the process illustrated in FIG. 4, and described above may be repeated for phrases in addition to words.

In accordance with the embodiment illustrated in FIGS. 3–5, it is contemplated that the system will be enhanced with respect to the FIG. 1 embodiment by the presentation at step 44 of exercises with various energies and, for example, some general instruction on a particular energy, such as that published in the Lessac text, for example:

The TH Sound Effect (Cognate: TH Clarinet)

The thin, bellows-like friction stream of the TH sound effect is a dry and gentle whispered counterpart of the warm vibrations of its cognate, the TH clarinet. To feel the NRG of the TH sound effect, play the consonant as a clarinet, and then turn off the voice and continue in a whisper.

Play this sound effect lightly and softly without forcing your breath, which would turn the thin whisper into an undesirably heavy, throttled hiss. You should feel a steady but almost airless sensation of the escaping breath stream Play the TH sound effect as a light, thin whisper in the following words. Be particularly careful to play the consonants that occur immediately before the TH.

| wreath | earth | birthday | myth | teeth | booth |
|---|---|---|---|---|---|
| breathless | months | truth | tenths | ruthless | siksths (sixths) |
| forthwith | fifths | wealth | faithful | breadth | width |

Play the TH sound effect while exploring the following sentences:

You have been ruthless, unfaithful, and uncouth, so spare
    me your breathless, mythful truths.
The width, length and breadth of the earth would take
    thwarted monthmonths to traverse.
Now play the TH sound effect and other playable consonants in this poem:
The breathless months move slowly over earth
    as the forth threnody brings to truth
      the myths of time:
      Thwarted thoughts
      and lost desires . . .
on the last long breath, of that siksth (sixth) year."

In addition to the various uses of the Lessac texts, the invention also contemplates the use of Lessac type illustrations from Lessac's teachings on the computer screen in conjunction with the relevant section.

In addition, at step 44, words or short phrases exhibiting various colors, such as the various Lessac energies, may be produced and the accuracy with which the student reproduces the word's pronunciation properly and the desired Lessac energy proper properly is measured by the system by referring to the various databases of the words and their colors, such as Lessac energy, to determine whether the student is pronouncing the word or phrase properly.

In addition, at step 50, presentation of an exercise, followed by the implementation of that exercise at step 52 may be implemented. Such an exercise may be one of those presented in the Lessac text, such as:

"Exploration VII: The Y-Buzz Tonal Current

Begin with a rich, vibrant, gently ringing Y-buzz and run it into the first word of the following phrases. Carry over as much tonal color and focus as possible throughout the rest of each phrase and return to the Y-buzz tonal energy on the last word. Make it believable; interpret and characterize each phrase with involvement and imagination.

| | |
|---|---|
| 1. | Y≈≈≈y≈≈≈y≈≈≈Keep cool, Mimi |
| 2. | Y≈≈≈y≈≈≈y≈≈≈We'll go see |
| 3. | Y≈≈≈y≈≈≈y≈≈≈He called me |
| 4. | Y≈≈≈y≈≈≈y≈≈≈We're odd people |
| 5. | Y≈≈≈y≈≈≈y≈≈≈These toys break |
| 6. | Y≈≈≈y≈≈≈y≈≈≈He'll calm thee |
| 7. | Y≈≈≈y≈≈≈y≈≈≈Read aloud, please |
| 8. | Y≈≈≈y≈≈≈y≈≈≈She asked me |
| 9. | Y≈≈≈y≈≈≈y≈≈≈Green eyes, I see |

The sensation is like moving form a hot sun to semi-shade and back again, or, better still, like gliding swiftly in a strong current and then drifting smoothly and restfully into the outer edges of that current; but you must remain within the general current. Finding yourself totally outside the free-flowing Y-buzz tonal current should then function as a positive awareness of omission and signal you to glide back into the current's flow. If the dilute resonance feels a bit nasal at first, check for nasality by pressing your nostrils together. If there is no tonal change, what you feel is nasal resonance, not nasality.

Begin again with a rich, vibrant Y-buzz warm-up, and, staying with the Y-buzz tonal current, communicate the following lines with the intention to convince and to persuade.

Y≈≈≈y≈≈≈y≈≈≈This is the way to feel the focus . . .

Y≈≈≈y≈≈≈y≈≈≈Feel the focus and keep it this way . . .

Y≈≈≈y≈≈≈y≈≈≈If we feel the focus and really keep it this way . . .

Y≈≈≈y≈≈≈y≈≈≈We will always be able to feel an easy control over our speech and voice!

Now with a single Y-buzz preparation, impart the lines in a two- or three-sentence structure. Be actively aware of staying within the Y-buzz tonal current."

Also in accordance with the present invention, it is contemplated that general information with respect to Lessac techniques may be presented, for example at step 28 the system may output the following to the personal computer monitor:

"The Consonant Orchestra"

FIGS. 5–1 illustrates the entire range of musical consonants classified in this chapter—a full complement of strings, drums, woodwinds, and cymbals and a fair representation of sound effects and brass. Not included in the consonant orchestra, nor in the consonant chart (Table 5-1), are the consonant sounds Q, X, C, and WH. The Q is always sounded as either K as in technique or KW as in quiet; the X, as KS as in extra, GZ as in exact, or Z as in Xerox, and the C as S as in infancy, K as in credo, CH as in cello, or SH as in ancient. When properly pronounced, WH is an HW—the first an unvoiced consonant and the second a voiced consonant; it is not, as some phoneticians claim, the unvoiced counterpart of the W. That consonant is no more affected by the H sound before it in "when" than by the K sound before it in "queen". The consonant orchestra does, however, include the TS, as in its or artists, and the DZ, as in buds or bonds, because they are separate instruments and separate consonants and appear as such in the alphabets of numerous foreign languages.

You will note in the consonant chart (see Table 5-1) that nine consonants have counterparts, or "cognates"—that is, they are paired. There is no articulatory or mechanical difference in the way the two members of a pair are produced; if you can execute one properly, you can execute the other equally well. The only difference is that one uses voice, the other, breath. The unvoiced consonants, because they are made without phonation of the vocal folds, are the only speech sounds that are produced entirely within the oral cavity and appear to make their way out through the lips. They are made with the glottis open and can only be whispered. But even these whispered sounds are made without breathin: the S, F, SH, and unvoiced TH are executed best when practically no breath stream can be felt coming through the lips; even the P, T, and K can and should be made without conscious use of breath, although this admittedly requires consummate skill and virtuoso control.

Voice the whispered consonants and they will turn into their voiced counterparts (or, as in the case of H, disappear since it has no counterpart); whisper voiced consonants and they will turn into their unvoiced counterparts or, as in the case of the noncognates, revert to escaping breath.

TABLE 5-1

CONSONANT CHART

| Voiced | Unvoiced |
|---|---|
| These consonants are phonated with vocal-fold vibration and cannot be whispered. | These consonants are produced without vocal-fold vibration and cannot be voiced. |

| COGNATES | |
|---|---|
| as in babe . . . B | P . . . as in pope |
| as in dead . . . . D | T . . . as in tight |
| as in agog . . . G | K . . . as in cook |
| as in noon . . . N | |
| as in mime . . . M | |
| as in verve . . . V | F . . . as in fife |
| as in zone . . . Z | S . . . as in safe |
| as in breathe . . . TH | TS . . . as in breath |
| as in pleasure . . . ZH | SH . . . as in wish |
| as in sing . . . NG | |
| as in lilt . . . L | |

TABLE 5-1-continued as in window . . . W
as in beyond . . . Y
as in rewrite . . . R as in judge . . . DG
as in intends . . . DZ H . . . as in high
CH . . . as in church
TS . . . as in physicists As noted above, prior art speech recognition engines work by generating databases of phonemes which make up words in the database. This is done on a statistical basis by having huge amounts of English text read into the database by speakers. The text is separated into various phonemes and the pronunciation of each individual phonemes is statistically normalized to use as a reference during speech recognition. In contrast, the present invention contemplates the statistical mobilization of phonemes, words and/or phrases, as segregated into cliques.

In order to make possible training of a voice with different energies and colors, the inventive system does not contemplate mixing of all sorts of pronunciations, all sorts of proper pronunciations, and so forth of a given word to get a standardized pronunciation and then implement voice recognition off that information. Rather, the inventive system considers proper pronunciations based upon a particular word order, and the frequency with which that particular proper pronunciation of a given word occurs, to get improved recognition accuracy and speed.

In accordance with an alternative embodiment, the system contemplates the input into the system various pronunciations. This is followed by counting the occurrences of the particular variations of pronunciation and associating with each one a statistical likelihood.

As alluded to above, the system is equally applicable to variations including 1) real mispronunciations with very low statisticsal incidences, 2) common lazy mispronounciatrions (e.g. "I axxed you the question."), 3) statistically low regionalisms, 4) second language mispronunciations, and 5) word order pronunciation variations. It is believed that common lazy mispronunciations, statistically low regionalisms, and word order pronunciation variations will be a primary importance.

It is also contemplated that, in the case of which recognition systems which also include text-to-speech responses, for example, in an information line or an automated ordering system, the present invention will allow the implementation of the detection of, for example, and emotion, allowing an improved response to a customer on an automated line.

As noted above, recognition in accordance with the embodiment of FIG. 3 is different from conventional recognition operations. More particularly, referring to FIG. 5, at step 506 audio is input into the system and a conventional speech recognition algorithm is used to determine the database entry which most nearly comprises a match at step 508. At step 510 the energy associated with that entry is recognized. Energies are then tallied 512 to determine the overall color of the speech being input into the system and at step 514 the system limits the database being searched for a match to the database with the relevant Lessac energy or other relevant color.

At step 516, recognition of speech then proceeds with the limited database. In the event that a good match is not seen in the limited database, the software explores other databases in an attempt to find a better match. At the same time, the energy or color associated with each recognition is noted 518. Energies are tallied at step 520, and in response to a predominance of the new energy, the energy preference is revised at step 522 and the system continues to implement that new energy or color preference at step 514 proceeding to steps 516–522 until the spoken language segment to be transcribed into text has been presented in textual form.

The present invention is in contrast to prior art speech recognition systems which result in numerous situations where recognition of the correct word is ambiguous.

In the prior art, this is addressed by arraying the candidate words from highest to lowest according to the probability of the candidate word being the correct word. If the highest word were to receive 100% then that would be the correct word. 1 The reference database for recognizing phonetic sequences is created by capturing pronunciations of words from thousands of persons representing the general population of speakers.

It is noted that there are sound alike words that have different meanings and which require context for clarification. For example the following three words would all have equivalent phonemic identities: "to," "too," and, "two." In this invention, we are addressing those circumstances where a candidate word is assigned a lessened probability of correctness because of what might be considered a "mispronunciation."

In one embodiment of the inventive method, we begin with rule-based creations of multiple databases where the speakers are Certified Practitioners of the Lessac System for voice use and communication.

The databases serve as standard references of phonetic sequences and acoustic profiles2 used to automatically identify speech and present the text version of the spoken words. When processed phonetic data from a SR (speech recognition) processor yield lower than acceptable candidate word probabilities, one or more alternate databases are searched for matches yielding higher candidate word probabilities. A match indicates that a candidate word has been found which has a higher probability of being the correct candidate word based on an alternative phonetic sequence.

In the inventive method, we address five types of "mispronunciations" according to prior art. They are identified above and discussed below below and presented roughly in order from lowest to highest incidence of occurrence in normal speech: real mispronunciations which are idiosyncratic to individual speakers and which have very low statistical incidences; colloquial articulatory errors of pronunciation that are geographically dispersed among the population, e.g. "I axed you a question."; regionalisms that range from relatively low incidence [such as the Midwestern question: "What can I getch yez?" in place of "What can I get for you?"] to relatively high incidence [such as the Southern use of "you all" or "y'all" in place of the generic "you" or "everyone"].

With the exception of phoneme substitutions by non-native speakers attempting to pronounce the specified language. An example from a native Japanese speaker who pronounces "long" as "rong" which matches the phonetic sequence for "wrong." Whenever "phonetic sequence" is used, it refers to speech data including an acoustic profile of phonemes, consonants, vowels, and measures of duration and tonality.

Relatively high incidences of mispronunciation that occur because a native speaker in one language is attempting to use proper pronunciation in a second, non-native, language [when a speaker's pronunciation of a previously mispronounced word is correctly recognized as frequently as when pronounced by a native speaker, the non-native speaker is said to be "bilingual"]; and, pronunciations that have insufficient or ambiguous word candidate probabilities so the correct candidate word is not recognized from the phonetic data, or where, post phonetic analysis fails to yield a sufficient "goodness of fit" word score to the candidate, because the prior art forms of recognition engines fail to distinguish those rule-based changes for pronouncing words due to the locations of words and consonants in the overall sequence of words. In the inventive method described below, these are not treated as mispronunciations, but as errors of recognition.

Alternative pronunciations are used in two ways in the inventive method, namely to identify individual patterns of mispronunciations made by individual speakers; and, to increase the percent of correctly identified words uttered in a sequence of words, thus raising the overall effectiveness level of speaker independent natural language recognition.

In the inventive method, we do not combine pronunciations of a given word by speakers having substantial dispersions of articulatory patterns, dialects, and native languages to arrive at an "average" pronunciation of a given word that is then normalized and used as the phonetic reference for assigning a "goodness of fit" probability to the word. Rather, we use multiple phonetic databases having alternative pronunciations for each dictionary word spoken individually and as part of a phrase or sentence, and according to the type of alternative pronunciation. In the preferred embodiment of the invention, these databases are prepared from words and phrases spoken by, for example, Lessac Certified Practitioners, using Lessac phonetics and articulatory principles. Such Certified Speakers are used to pronounce all words, whether correctly pronounced or mispronounced.

In the invention, alternative pronunciations are determined by rules set forth according to the Lessac System of instruction for voice use and communication. Each such rule is used to identify an alternative phoneme and its associated grapheme for determining the proper text output of the candidate word.

There is no database of type 1 mispronunciations as these are "true" errors of pronunciation without sufficient incidences to identify a pattern of alternative pronunciation, either within the pronunciations of a single speaker, or among all the pronunciations of all speakers.

Types 2, 3 and 5 can be used to identify a pattern of word and phrase specific alternative pronunciations of a single speaker as well as the pronunciations of all speakers. In this latter case, which is often referred to as natural language recognition, the circumstances can be applied either in circumstances of speaker-identified natural language recognition or where speaker independent recognition is being used.

The invention creates multiple databases containing phonetic sequences and acoustic data profiles of phonemes, vowels and consonants, along with their associated graphemes. The output text presents the spelled word as one might find it in a printed reference dictionary such as Webster's Collegiate Dictionary. The invention consists of the following databases:

Phonetic Sequences, acoustic profiles, graphemes and text for Correctly Pronounced Individual Words Alternative Phonetic Sequences, acoustic profiles, graphemes and text for Identifying Alternative Pronunciations of a Word Based on the Word and its
  Position in a Pronounced Sequence of Words Phonetic Sequences, acoustic profiles, graphemes, and text for Identifying Correct Alternative Words and Pronunciations of Words according to a Known Dialect of the Native Language Phonetic Sequences, acoustic profiles, graphemes and text for Correctly Identifying Alternative Pronunciations of words according to Commonly Occurring Errors of Articulation by Native Speakers of a Specified Language.

The general method of constructing each of the databases is detailed below. 1. Basic Acoustical Dictionary of Phonetic Sequences for Correctly Pronounced Individual Words A sample of words that is statistically sufficient to be representative of phonetic sequences for all words in a dictionary of American English [for example, Webster's Collegiate Dictionary] is drawn. Each word in the sample is pronounced by persons representing high pitched, low pitched, rapidly spoken and slowly spoken, as well as male, female, young and old speakers. All frequencies, including harmonics created by the voice, in the range of [500 and 20,000 hz] are recorded for each speaker's pronunciation of the sample words. All persons who pronounce words for the database must be Certified Practitioners of a single, kinesensic method of voice use and training, having its own phonetics and pronunciation rules. The Lessac System of instruction for voice use and communication is such a system and is meant wherever the term Certified Speaker is used. Speakers both pronounce the sample words according to the phonetic and articulatory rules and then listen to a high fidelity reproduction of the words pronounced by another speaker. They identify unintended errors of pronunciation and remove them from inclusion in the acoustical phonetic database. This basic dictionary will use the dialect of "Educated General American Speech" as it is the dialect most used by speech professionals in the various media and which is regularly heard on an everyday basis by the largest cross-section of the American population.

The phonetic sequence for each sample word that is accepted as correctly pronounced is then included in the database and is stored in its entirety as a single pronunciation of a given word. The associated grapheme and word, including its phonetic notations and pronunciation rules, will also be stored. This database is the "original recorded database" that will allow every word spoken by every speaker to be accessed separately.

Phonetic sequences for a word are combined and then normalized. The word, and its "normalized" phonetic sequence is stored in the basic dictionary database to serve as the speech recognition reference standard for properly pronounced words in the basic dictionary when spoken individually. The basic dictionary database will also contain the phonetic notations, pronunciation rules, and the associated graphemes for presenting the word as text.

For words in American English that were not pronounced, the normalized phonemes and sequence of phonemes will be simulated according to the phonetic sequence for the word not spoken, using the appropriate rules of pronunciation and indicated acoustic profile as they relate to the word not spoken, and with the appropriate graphemes for representing the word as text. Various samples of these simulated word pronunciations will be reproduced and listened to by Certified Practitioners and those that are judged to have unintended errors are identified and set aside for pronunciation correction using the same Certified Practitioners as the ones pronouncing the words for the phonetic dictionary development.

The resulting dictionary database can be of any size or specialized American English use that has been assembled by pronunciation rules consistently applied and then normalized to serve as a database dictionary reference for speech recognition of words pronounced individually.

2. Basic Dictionary of Alternative Phonetic Sequences and Acoustic Profiles for Identifying Correct Alternative Pronunciations of a Word Based on the Word and its Position in a Pronounced Sequence of Words This database is built using the methods and procedures similar to those used in Database 1 above. The differences are in the words and pronunciation rules for words found in this alternative proper pronunciation database. In this database the dictionary is comprised of words for which the pronunciation of the word is modified because of the word and its position in a pronounced sequence of words. The modifications of pronunciation yield alternative phonetic sequences for a word where the alternative phoneme(s) is(are) properly used based on the pronunciation rule that applies to that word's position in the sequence of words uttered. This process yields a dictionary of words that have alternative phonemic sequences for the corresponding word in the basic dictionary. The alternative phonemes and corresponding alternative graphemes map to the correct text form of the word and represent a correct alternative pronunciation of the word because of the word's position in the sequence of words being pronounced.

The sampling procedure here is different from that of Database 1. In this case, it is the sequence of words uttered and the pronunciation rule applying to the sequence of words that results in an alternative phonetic sequence that is recognized as correct pronunciation. Thus, the sample to be drawn involves a statistically adequate sample of combinations of words where the pronunciation rule is dependent upon the word, and for its relationship to the beginning and/or ending of the preceding and/or following words in the phrase to be spoken. The application of the pronunciation rules results in an alternative correct pronunciation of such words when spoken as part of a sequence of words. This sample is drawn using a computational linguistic analysis of beginnings and endings of words and the identifying of all combinations that are cognitively meaningful as they are a recognized part of speech when used in combination. [E.g. in the sequence: 'help pack', one pronounces the two words together with a prepare and link pronunciation rule. In this rule, help does not have its last consonant p fully pronounced but ends with the mouth in the position of fully prepared to pronounce the 'p' in the following word pack. The two words are "linked" by receiving a shorter than normal pause between the end of 'help' and the commencing of 'pack' than would normally occur between words.]

Again, as in preparing Database 1 above, a Certified speaker becomes a Certified listener to high-fidelity reproductions of the pronunciation of words by a speaker other than the listener. The listener notes and removes those words that have unintended errors of pronunciation for the required pronunciation of the word according to its position in the sequence of words being pronounced. In those cases where both the preceding and the following word also have correct alternative pronunciations, an error of pronunciation of one will require the removal of the word sequence pronounced.

The phonetic sequences for each sample word, as well as those of the preceding and/or following word also involved, and that is accepted as correctly pronounced, is then included in the database and stored in its entirety as a single pronunciation of a given word. The associated grapheme and word, including its pronunciation rule, will also be stored. This database is the "original recorded database" that will allow every word, spoken by every speaker for all words among a specified sequence of uttered words, to be accessed separately.

A combined version of phonetic sequences are then normalized and stored in the basic dictionary database to serve as the speech recognition reference standard for alternative pronunciations of a word based on the word and its position in a sequence of pronounced words. This database will also contain the pronunciation rules and the associated graphemes for displaying the involved words as text.

For those cognitively meaningful combinations of word beginnings and endings in American English that were not pronounced, the normalized phonetic sequence for the words not spoken will be simulated, using the appropriate rules of phonetic notation and pronunciation, and with the appropriate graphemes for displaying the words as text. Various samples of these simulated word pronunciations will be reproduced and listened to by Certified Practitioners and those that are judged to have unintended errors are identified and set aside for pronunciation correction using the same Certified Practitioners that originally pronounced words for this particular dictionary database.

The resulting phonetic dictionary database can be of any size or specialized American English use that has been assembled by pronunciation rules consistently applied and then normalized to serve as a database dictionary reference for speech recognition of alternative pronunciations of a word based on the word and its position in a sequence of pronounced words.

3. Dictionary of Phonetic Sequences for Identifying Correct Alternative Pronunciations of a Word according to a Known Dialect of the Native Language The universe of speaking styles and dialects can be obtained by consultation with linguistics experts and then estimating the numbers of persons speaking each particular pattern. Depending on the minimum number of speakers with a particular dialect that would make it economically viable to have a specialized speech recognition database, there could be numerous such databases. This database is for just one example, the Southern U.S. Dialect of Educated General American Speech (Southern Dialect). To establish databases of correctly identified proper pronunciations for a given dialect, the inventive method develops rules-based pronunciations for words spoken in the dialect. The same inventive method switches to an alternative reference database when phonetic patterns indicate higher probabilities of candidate words are likely when using an alternative correct pronunciation database for an American English word individually or according to the alteration in pronunciation required because of the word/s location in a sequence of uttered words.

4. Establishing Rules-Based dialectic pronunciations according to the Lessac System of Pronunciation and Communication.

5. Individual Word Pronunciation Database

This database is created by drawing a sample of words that is statistically sufficient to be representative of all forms of alternative word use patterns and words having non-standard pronunciations associated with a Southern Dialect for words in an American English dictionary.

To be statistically sufficient in terms of the number and variety of pronunciations within the dialect, at least fifty native speakers of the Southern Dialect will need to be identified and asked to pronounce each of the sample words individually.

The phonetic sequences for each sample word is then included in a database and stored in its entirety. The associated grapheme and word, including its pronunciation rule, will also be stored. This database is the "original recorded database of Native Southern U.S. Dialect of Educated General American Speech Speakers" that will allow every word spoken by every speaker to be accessed separately.

Certified Lessac Practitioners will listen to high-fidelity reproductions of the Southern Dialect Speakers and then provide rules and associated notations for properly speaking the dialect.

Each Lessac Practitioner will then pronounce the same sample of words, in accordance with the rules for speaking the dialect, as were spoken by the Southern Dialect Speakers. Each Certified Practitioner will pronounce the sample words and then listen to high fidelity reproduction of the words pronounced by another Certified Practitioner so that unintended errors of pronunciation are removed from inclusion in the database of pronunciations.

The phonetic sequences for each sample word accepted as correctly pronounced is then included in the database and stored in its entirety as a single pronunciation of a given word. The associated grapheme and word text, including its pronunciation rule, will also be stored. This database is the "original recorded database of Lessac Certified Practitioners speaking with a Southern U.S. Dialect of Educated General American Speech" that will allow every word to be accessed separately.

A combined version of phonetic sequences for sample words are then normalized and stored in the basic dictionary database to serve as the Southern Dialect speech recognition reference standard for individually pronounced words. The dictionary database also contains the associated graphemes for displaying the text form of the recognized word.

6. Word Pronunciation Database for a Dialect Where the Pronunciation of a Word is Modified Because of the Word's Position in a Sequence of Words.

This database of is similar to Database 3.A.1 above, but involves pronouncing particular sequences of words as phrases, sentences, or paragraphs. This dictionary database is comprised of words for which the pronunciation of words in the Southern Dialect is modified because of the word and its position in a sequence of words. The database contains alternative phonetic sequences for a word based on the pronunciation rule that applies to that word's position in the sequence of words. This process yields a dictionary database of words that have alternative phonemic sequences for the corresponding word in the individual word dictionary. The alternative phonemes and corresponding alternative graphemes map to the correct text form of the word and represent a correctly used alternative pronunciation of the word.

The sampling procedure here is different from that presented in 3.A.1 above. In this present case, it is the sequence of words and rules for their pronunciation that results in an alternative phonetic sequence correctly recognizing the word as pronounced. Thus, the sample to be drawn involves a statistically adequate sample of combinations of words where the pronunciation rules for the beginning and/or ending of the preceding and/or following words are different from the rules for pronouncing individual words. Computational linguistics are used to estimate the number of beginnings and endings of words for combinations that are cognitively meaningful, using the words in the particular American English dictionary selected to represent the universe of American English words. Sample sizes will be sufficient to represent the relative incidence of word combinations in cognitively meaningful combinations.

Again, as in preparing Database 3.A.1 above, at least fifty native speakers of Southern Dialect will pronounce the phrases containing the word sequences for the sample of cognitively meaningful combinations. This first database of high fidelity recordings is the "Original Database of Native Southern U.S. Dialect of Educated General American Speech Speakers" that will allow every word, spoken by every speaker for all words among a specified sequence of uttered words, to be accessed separately.

Certified Practitioners will listen to high-fidelity reproductions of the Southern Dialect speakers and then provide rules and associated notations for proper alternative pronunciation of words according to their position in a sequence of words. Each Certified Practitioner will then pronounce the same sample of sequenced words in accordance with the rules for speaking the dialect. [i.e., they will speak the same sample sets as were spoken by the Native Southern U.S. Dialect of Educated General American Speech Speakers.]

Each Certified Speaker then listens to high-fidelity reproductions of pronunciations of the sample words by another Certified Speaker. The listener notes and removes those words that have unintended errors of pronunciation for the required pronunciation of the words. In those cases where the preceding and/or following words also have correct alternative pronunciations, an error of pronunciation of any one word of the sequence will require the removal of the pronounced word sequence.

The phonetic sequence for each word in the cognitively meaningful combination phrases, is then included in the database and stored in its entirety as a single pronunciation of a given word in an identified sequence of words. The associated graphemes and resulting text for the word, including its alternative pronunciation rule, will also be stored. This database is the "Original recorded Database of Southern U.S. Dialect of Educated General American Speech Pronounced by Certified Practitioners." This database will allow every word, spoken by each Certified Practitioner, to be accessed separately.

A combined version of phonetic sequences are then normalized and stored in the basic dictionary database to serve as the Southern U.S. Dialect of Educated General American Speech. It is the speech recognition reference standard for alternative pronunciations of a word based on the word and its position in the sequence of words. The associated pronunciation rules, graphemes, and text for displaying each word are also stored in the database.

For the cognitively meaningful combinations of word beginnings and endings in American English that were not pronounced using Southern U.S. Dialect of Educated General American Speech Dialect, the normalized phonetic sequences for the words not spoken will be created by simulation of the words not spoken, using the appropriate rules of pronunciation as they relate to the words not spoken, and with the appropriate graphemes involved. Various samples of these simulated word pronunciations will be reproduced in high-fidelity sound and listened to by Certified Lessac Practitioners and those that are judged to have unintended errors (i.e. they are an exception to the rule) are identified and set aside for re-entering the correct pronunciation using Certified Practitioners as speakers pronouncing the words. The assembled exceptions are collected and subsequently used to examine whether it is possible to create rules for identifying the exceptions to the rule so that the pronunciation that corresponds to the exceptions rule can be accurately recognized.

The resulting dictionary database Southern U.S. Dialect of Educated General American Speech Dialect serves as a reference standard for alternative pronunciations for of words as determined by the word's position in a sequence of pronounced words. The dictionary database, using simulated word pronunciations, can be of any size in terms of number of words, or for any specialized American English usage.

7. Dictionary of Phonemic Sequences for Correctly Identifying Alternative Pronunciations Based on Commonly Occurring Types of Improper Articulations in Native Language Speakers.

These mispronunciations are generally due to improper articulation of consonants. Some examples are 'cah' in place of 'car', and 'I axed you a question.'

These mispronunciations are speaker specific. These are what one trains one's speaker dependent dictation software to recognize when one dictates. This is usually easier than learning how to pronounce the word correctly, especially in the case of run-on phrases or idiosyncratic individual word pronunciations which have become habitual. Many of these involve words of infrequent use in daily language, but which are committed by many persons so they become statistically identifiable as 'common mispronunciations.' Some examples are 'nuculer' in place of 'nuclear,' 'libary' in place of 'library,' and 'Febuary' for 'February.' In terms of an individual speaker's pronunciations, one will find the same pattern appearing wherever similar word and phrase sequences occur, or where words having similar articulation requirements are encountered. [Many tongue-twisters use this phenomena to humorous advantage by asking a clear articulator to say a specific phrase quickly and repetitively—e.g. 'I'm a sheet slitter; I slit sheets; I'm the best sheet slitter that ever slit a sheet.']

8. Establishing the Incidence of Common Mispronunciations According to the Lessac System of Pronunciation and Communication.

Identifying common mispronunciations of words is obtained by having ordinary native speakers of Educated General American dialect pronounce words individually, as well as when used in phrases and sentences that represent samples of normal words and phrases where the pronunciation of a given word is modified according to its position in the sequence of words uttered. Text output from presently available speech recognition software is matched against the words and phrases the individuals were asked to pronounce.

The recorded pronunciations for the commonly mispronounced words are reviewed by Certified Practitioners to diagnose and note the rules of pronunciation that were being ignored or improperly applied. The acoustic data are normalized and used to provide alternative phonetic sequences for the dictionary of words commonly mispronounced, thereby identifying the correct word commonly mispronounced and outputting the proper text representation.

9. Individual Word Mispronunciation Database

This database is created by using the word sample as developed for Database 1 above ['Basic Dictionary of Phonemic Sequences for Correctly Pronounced Individual Words'].

Each word in the sample is read by numerous persons representing high pitched, low pitched, rapidly spoken and slowly spoken, as well as male, female, young and old speakers. All frequencies, including harmonics created by the voice, within the frequency range of 500 to 20,00 hz are captured in the readings of individual words.

The speakers use presently available speech recognition software and pronounce the individual words. Text output from the speech recognition software is matched against the input words the individuals were asked to pronounce. A mismatch between the text output and the required word identifies the mispronunciation.

The phonetic sequence for each sample word is included in a database and stored in its entirety. The associated graphemes and word, including its pronunciation rule, are also stored. The database is the "original recorded database for identifying common mispronunciations" that will allow every word spoken by every speaker to be accessed separately.

A minimum frequency of mispronunciation of a given word is established and all the words that exceed that frequency are copied into a separate database of common mispronunciations. Certified Practitioners will listen to high-fidelity reproductions of the mispronunciations and then provide pronunciation rules and associated notations for accurately uttering the commonly mispronounced words. The acoustic patterns will also be normalized and compared to the acoustic patterns for the correct pronunciation of each mispronounced word.

Each Certified Practitioner will then utter the mispronounced words, in accordance with the rules for speaking common mispronunciations. Each Certified Practitioner will pronounce the word samples and then listen to high fidelity reproduction of the same word samples pronounced by another speaker noting those pronunciations that failed to follow the rules of mispronunciation. The pronunciations that failed are removed from the database of mispronunciations.

The phonetic sequence for each sample word accepted as accurately mispronounced remains included in the database, which is stored as a single pronunciation of a given word. The associated grapheme and word, including its mispronunciation rule, will also be stored. This database is the "original recorded database of Certified Practitioners providing accurate pronunciations of common mispronunciations" that will allow every accurately mispronounced word to be accessed separately.

A combined version of phonetic sequences are normalized and stored in the basic dictionary database to serve as the speech recognition reference standard for commonly mispronounced words spoken individually. The dictionary database of common mispronunciations also contains the associated graphemes for portraying the text of the correct word recognized in its mispronounced form.

10. Database of Common Word Mispronunciations When Speaking a Sequence of Words.

This database of words is built using the same sample of words and phrases as in Database 2 above. [Basic Dictionary of Alternative Phonetic Sequences for Identifying Correct Alternative Pronunciations of a Word Based on the Word's Position in an Uttered Sequence of Words.] Each sample sequence is pronounced by numerous persons representing high pitched, low pitched, rapidly spoken and slowly spoken, as well as male, female, young and old speakers. All frequencies, including harmonics created by the voice, in the frequency range of 500 to 20,000 hz are captured in the pronunciations.

The speakers use presently available speech recognition software and pronounce the word sequences comprising the sample. Text output from the speech recognition software is matched against the input words the individuals were asked to pronounce. A mismatch between the text output and the required word identifies the mispronunciation.

The phonetic sequence for each sample word is included in a database and stored in its entirety. The associated graphemes and word, including its pronunciation rule, are also stored. The database is the "original recorded database for identifying common mispronunciations of words when spoken as part of a sequence of words uttered" that will allow every word spoken by every speaker to be accessed separately.

In this database, the dictionary of common mispronunciations when speaking a sequence of words, a mispronunciation is determined when the word in the sequence of text read is not recognized correctly either as an individual word, or as an alternative pronunciation for the correct individual word where the pronunciation of the word is modified because of the word's position in a sequence of uttered words.

A minimum frequency of mispronunciation of a given word in a given sequence is established and all the words that exceed that frequency are copied into a separate database of common mispronunciations. Certified Practitioners will listen to high-fidelity reproductions of the mispronunciations and then provide pronunciation rules and associated notations for accurately uttering the commonly mispronounced words. The acoustic patterns will also be normalized and compared to the acoustic patterns for the correct pronunciation of each mispronounced word.

Each Certified Practitioner will then accurately mispronounce the commonly mispronounced words, in accordance with the rules for speaking common mispronunciations. Each Certified Practitioner will pronounce the sample of phrases and sentences and then listen to high fidelity reproduction of the words pronounced by another Certified Practitioner. Those pronunciations that failed to follow the rules of mispronunciation for words spoken in sequence are removed and not included in the database of mispronunciations.

The phonetic sequence for each sample word accepted as accurately mispronounced in a sequence of words is then included in the database and stored in its entirety as a common mispronunciation of a given word according to its position in a sequence of words. The associated graphemes and word, including its mispronunciation rule, will also be stored. This database is the "original recorded database of Certified Practitioners providing accurate mispronunciations of words commonly mispronounced in a sequence of words" that will allow every commonly mispronounced word to be accessed individually and according to the word(s) that preceded it and/or followed it.

Combined phonetic sequences are normalized and stored in the basic dictionary database to serve as the speech recognition reference standard for commonly mispronounced words spoken as part of a sequence of words. The dictionary database of common mispronunciations also contains the associated graphemes for displaying the text form of the correct word recognized in its mispronounced form.

Cognitively meaningful combinations of word beginnings and endings in American English that were not spoken are simulated for inclusion in the reference database of mispronunciations. The words to be included are identified by the word sequence combinations not spoken where the rules for pronouncing common mispronunciations are associated with word sequence mispronunciations for the unspoken words that is equal to or larger than the cut-off frequency for individual word mispronunciations, expressed as so many common mispronunciations per hundred pronunciation attempts. The normalized phonetic sequences for the commonly mispronounced words not spoken will be constructed by simulation according to the structures of the words not spoken, using the appropriate rules of mispronunciation as they relate to the words not spoken, and with the appropriate graphemes involved. Various samples of these simulated word pronunciations will be reproduced in high-fidelity sound and listened to by Certified Lessac Practitioners and those that are judged to have unintended errors or mistakenly correct pronunciations are identified and set aside for re-entering the correct mispronunciations using Certified Practitioners as speakers pronouncing the words.

The resulting dictionary database of common mispronunciations of words when pronounced as part of a sequence of words, serves as a reference standard for common mispronunciations of words as determined by the word's position in a sequence of pronounced words. The dictionary database, using simulated word pronunciations, can be of any size in terms of number of words, or for any specialized American English usage.

Database Use

The alternative sets of phonetic dictionaries based on rule-based pronunciations are the basis for a new design of faster and more accurate speech recognition engine. Speed comes from more of the speech data stream being recognized by the phonetic sequences of the of that data stream. Speed improvement also comes from having fewer remaining words following the phonetic identification stage, that need to be recognized by using predictive grammars and other techniques. Whether the greatest speed can be achieved by successively passing the phonetic speech data stream past each alternative reference dictionary database, or by parallel processing multiple copies of the phonetic speech data. Either approach, sequential or parallel, can be combined with other down-stream candidate word resolving techniques. The multiple databases of reference dictionaries, when used in conjunction with a prior art speech recognition program, can also be used to modify and enhance the goodness of fit probabilities of a candidate word in a set of candidate words correctly identify a word that was not in the initial set of candidate words and confirm that the words in the prior set of candidate words have lower goodness of fit probabilities than the probability of the newly identified candidate; and improve the identification of "real" mispronunciations and distinguish them from the alternative pronunciations that are identified violations of pronunciation rules.

While illustrative embodiments of the invention has been described together with several alternatives for various parts of the system, it is, of course, understood that various modifications will be obvious to those of ordinary skill in the art. Such modifications are within the spirit and scope of the invention, which is limited and defined only by the following claims.

What is claimed is:

1. A computer-implemented speech training method utilizing a computerized system, the computerized system being capable of inputting speech from a user, of recognizing the input speech and of outputting to the user information as to the speech recognized and audible words to be heard by the user wherein the computerized system has a data processing capability, optionally has a display screen and has access to a data storage facility and wherein a first proper pronunciation database of properly and individually pronounced words is stored in the data storage facility, the speech training method comprising:

(a) the user inputting to the computerized system desired words as speech;

(b) the computerized system outputting to the user information as to the speech recognized including information regarding at least one improperly pronounced word and information as to proper pronunciation of the at least one improperly pronounced word to help the user correct the mispronunciation;

(c) employing, stored in the data storage facility, a second proper pronunciation database comprising alternative phonetic sequences for the pronunciation of selected words in the first proper pronunciation database, the selected words being words each having an alternative proper pronunciations in a sequence of words; and (d) the computerized system referencing said first and second proper pronunciation databases for the speech input by the user to determine the propriety of pronunciation of each desired word according to the context of the input word when each input word is recognized; wherein the information regarding the at least one improperly pronounced word comprises information as to mispronunciation of the word as an individual word or as a word in one of the sequences of words in the second proper pronunciation database whereby the system can help the user speak the at least one improperly pronounced word correctly according to whether the word is to be pronounced as an individual word or as a word in one of the sequences of words.

2. A speech training method according to claim 1 wherein the second proper pronunciation database includes an associated grapheme and pronunciation rule for each selected word and for each alternative phonetic sequence for the selected word.

3. A speech training method according to claim 2 wherein the alternative phonetic sequences comprise a phonetic sequence for each selected word together with a phonetic sequence for the next preceding word in context or for the next succeeding word in context or for both said next preceding and succeeding words.

4. A speech training method according to claim 3 wherein the phonetic sequences for each selected word are stored in the database as a single pronunciation record for the selected word.

5. A speech training method according to claim 2 wherein the alternative phonemes and corresponding alternative graphemes for a selected word map to a single correct text form of the selected word.

6. A speech training method according to claim 1 wherein the context of the selected word comprises the position of the selected word in a sequence of words uttered.

7. A speech training method according to claim 1 wherein the first and second proper pronunciation databases are available for audio playback to the user through the audio output device.

8. A speech training method according to claim 7 further comprising:
(e) the user again speaking the at least one improperly pronounced word or words into the computerized system with attempted improved pronunciation;
(f) the system indicating to the user whether the at least one word or words is properly pronounced and playing back to the user through the audio output device a properly pronounced word or words intended to train the user in the proper pronunciation of the at least one improperly pronounced word.

9. A speech training method according to claim 8 comprising generating the second proper pronunciation database by recording statistically representative samples of the phonetic sequences of combinations of words in a language reference dictionary pronounced in accordance with pronunciation rules wherein the pronunciation rules are dependent upon the selected word, and the relationship of the selected word to the beginning or following word, or both the beginning and following words, in a phrase to be spoken.

10. A speech training method according to claim 9 wherein the statistically representative sample comprises sentence structures and pronunciation sequences and by the method comprises employing a computational linguistic analysis of beginnings and endings of words and by identifying combinations that are cognitively meaningful to draw the statistically representative sample.

11. A speech training method according to claim 9 wherein each word in the sample is pronounced by certified speech practitioners of a common method of voice use and training, optionally the Lessac system, the method of voice use and training having its own phonetics and pronunciation rules.

12. A speech training method according to claim 11 wherein the spoken words in the sample are representative of words spoken by high pitched, normally pitched, low pitched, rapidy spoken, normally spoken and slowly spoken speakers, by male, female, young and old speakers and by speakers of normal pitch.

13. A speech training method according to claim 11 comprising including in the spoken words in the recorded sample a full range of audible frequencies including harmonics created by the voice, the audible frequencies optionally being in the range of from about 500 to about 20,000 Hz.

14. A speech training method according to claim 11 comprising employing a certified speech practitioner speaker to listen to high-fidelity reproductions of the pronunciation of words for the second proper pronunciation database made by other certified speech practitioners.

15. A speech training method according to claim 14 wherein the listening practitioner notes and removes words having unintended errors of pronunciation and removes preceding and following words having proper alternative pronunciations.

16. A speech training method according to claim 8 wherein the first and second proper pronunciation databases comprise standard native language pronunciations, optionally standard American English pronunciations, of the phonetic sequences for the words in the databases.

17. A speech training method according to claim 16 comprising further employing, stored in the data storage facility, a proper pronunciation dialect database comprising acoustic profiles, graphemes, and text for identifying correct alternative words and pronunciations of words according to a known dialect of the native language.

18. A speech training method according to claim 16 wherein the proper pronunciation dialect database comprises a database of rules-based dialectic pronunciations according to the Lessac system of pronunciation and communication.

19. A speech training method according to claim 16 comprising further employing, stored in the data storage facility, an alternative proper pronunciation dialect database comprising alternative phonetic sequences for a dialect where the pronunciation of a word is modified according to the word's position in a sequence of words.

20. A speech training method according to claim 16 comprising further employing, stored in the data storage facility, a pronunciation error database of phonetic sequences, acoustic profiles, graphemes and text for correctly identifying alternative pronunciations of words according to commonly occurring errors of articulation by native speakers of the language.

21. A speech training method according to claim 16 comprising further employing, stored in the data storage facility, a Lessac pronunciation error database of common mispronunciations according to the Lessac system of pronunciation and communication.

22. A speech training method according to claim 16 comprising employing, stored in the data storage facility, an individual word mispronunciation database.

23. A speech training method according to claim 16 comprising employing, stored in the data storage facility, a database of common word mispronunciations occurring when speaking a sequence of words.

24. A speech training method according to claim 16 comprising further employing, stored in the data storage facility, two or more databases selected from the group consisting of: a proper pronunciation dialect database comprising acoustic profiles, graphemes, and text for identifying correct alternative words and pronunciations of words according to a known dialect of the native language; a database of rules-based dialectic pronunciations according to the Lessac system of pronunciation and communication an alternative proper pronunciation dialect database comprising alternative phonetic sequences for a dialect where the pronunciation of a word is modified because of the word's position in a sequence of words; a pronunciation error database of phonetic sequences, acoustic profiles, graphemes and text for correctly identifying alternative pronunciations of words according to commonly occurring errors of articulation by native speakers of the language; a Lessac pronunciation error database of common mispronunciations according to the Lessac system of pronunciation and communication; an individual word mispronunciation database; and a database of common word mispronunciations when speaking a sequence of words.

25. A speech training method according to claim 24 wherein the computerized system comprises a standard language model, a common phoneme error model, an exercise word model, an exercise phrase model, an exercise word error model and an exercise phrase error model.

26. A speech training method according to claim 8 wherein the computerized system comprises the display screen and a training text displayable on the display screen wherein the training text includes both exercise word models and exercise phrase models wherein the exercise word models and the exercise phrase models are organized in groups having common mispronunciation characteristics.

27. A speech training method according to claim 8 wherein the computerized system comprises at least one model selected from the group consisting of a standard language model, a common phoneme error model, an exercise word model, an exercise phrase model, an exercise word error model and an exercise phrase error model.

28. A speech training method according to claim 24 wherein the computerized system comprises a speech recognition program capable of recognizing words, mispronunciations and phoneme errors, and comprising audio recordings of proper pronunciations, the speech recognition program being operative during speech training sessions employing with the inventive interactive program wherein if no pronunciation error has occurred twice consecutively, the computerized system leaves the speech training routine and functions as a voice recognition system.

29. A speech training method according to claim 8 wherein the computerized system comprises a speech recognition program capable of recognizing words, mispronunciations and phoneme errors, and comprising audio recordings of the user's pronunciations, plus speech sounds for proper pronunciations, the speech recognition program being operative during the speech training.

30. A speech training method according to claim 29 wherein the computerized system is loaded with a speech recognition engine, the speech recognition engine having text editing and speech training utilities and with databases of word models, phrase models, vocal recordings and error models, the computerized system optionally being a personal computer available to the user.

31. A speech training method according to claim 8 wherein the computerized system comprises a speech recognition engine and wherein speech training and speech recognition are integrated to provide smooth switching between training and recognition modes to enable speech recognition to proceed and be intermittently supplemented with speech training as improperly pronounced words are encountered.

32. A speech training method as claimed in claim 31 wherein said computerized system provides the user speech training using Lessac System techniques.

33. A speech training method as claimed in claim 32, wherein the computerized system instructs the user in the correct pronunciation of a phoneme in terms of the sound of a musical instrument.

34. A method of speech training as claimed in claim 32, wherein the user is given the option of receiving speech training or training the program to recognize the user's speech pattern.

35. Programs and databases recorded on a CD-ROM or on permanent electronic storage media wherein the programs and databases capable of implementing a speech training method according to claim 1.

36. A computerized speech training system comprising a data processing unit, random access volatile memory available to the data processing unit, an audio device to audibilize output from the computerized system to be heard by the user and, optionally, a display screen, the computerized system having access to a data storage facility and further comprising stored in the data storage facility, a software program and at least one database to implement a speech training method wherein the software program comprises procedures to effect a speech training method according to claim 1.

37. A computerized speech training system according to claim 36 comprising, stored in the data storage facility, two or more databases selected from the group consisting of: a proper pronunciation dialect database comprising acoustic profiles, graphemes, and text for identifying correct alternative words and pronunciations of words according to a known dialect of the native language; a database of rules-based dialectic pronunciations according to the Lessac system of pronunciation and communication; an alternative proper pronunciation dialect database comprising alternative phonetic sequences for a dialect where the pronunciation of a word is modified because of the word's position in a sequence of words; a pronunciation error database of phonetic sequences, acoustic profiles, graphemes and text for correctly identifying alternative pronunciations of words according to commonly occurring errors of articulation by native speakers of the language; a Lessac pronunciation error database of common mispronunciations according to the Lessac system of pronunciation and communication; an individual word mispronunciation database; and a database of common word mispronunciations when speaking a sequence of words.

38. A computer-implemented speech training method utilizing a computerized system, the computerized system being capable of inputting speech from a user, of recognizing the input speech and of outputting to the user information as to the speech recognized and audible words to be heard by the user wherein the computerized system has a data processing capability, optionally has a display screen, and has access to a data storage facility and wherein a first proper pronunciation database of properly and individually pronounced words is stored in the data storage facility the speech training method comprising:

(a) the user inputting to the computerized system desired words as speech;

(b) the computerized system outputting to the user information as to the speech recognized including information regarding at least one improperly pronounced word and information as to proper pronunciation of the at least one improperly pronounced word to help the user correct the mispronunciation:

(c) employing stored in the data storage facility, a second proper pronunciation database comprising alternative phonetic sequences for the pronunciation of selected words in the first proper pronunciation database, the selected words being words each having an alternative proper pronunciations in a sequence of words; and (d) the computerized system referencing said first and second proper pronunciation databases for the speech input by the user to determine the propriety of pronunciation of each desired word according to the context of the input word when each input word is recognized wherein the information regarding the at least one improperly pronounced word comprises information as to mispronunciation of the word as an individual word or as a word in one of the sequences of words in the second proper pronunciation database whereby the system can help the user speak the at least one improperly pronounced word correctly according to whether the word is to be pronounced as an individual word or as a word in one of the sequences of words;

(e) generating the proper pronunciation database by recording specimen samples representative of the phonetic sequences of combinations of words in a language reference dictionary; and (f) each word in the sample being pronounced by persons who are certified speech practitioners of a common method of voice use and training, optionally the Lessac system, the method of voice use and training having its own phonetics and pronunciation rules.

39. A speech training method according to claim 38 wherein the spoken words in the sample are representative of words spoken by high pitched, normally pitched, low pitched, rapidly spoken, normally spoken and slowly spoken speakers, by male, female, young and old speakers and by speakers of normal pitch.

40. A speech training method according to claim 39 comprising employing a certified speech practitioner speaker to listen to high-fidelity reproductions of the pronunciation of words for the second proper pronunciation database, their recordings being made by other certified speech practitioners.

41. A speech training method according to claim 40 wherein the listening practitioner notes and removes words having unintended errors of pronunciation and removes preceding and following words having proper alternative pronunciations.

42. A speech training method according to claim 38 comprising including in the spoken words in the recorded sample a full range of audible frequencies in the range of from about 500to about 20,000 Hz.

* * * * *